United States Patent
Araki et al.

(10) Patent No.: US 7,602,995 B2
(45) Date of Patent: Oct. 13, 2009

(54) CORRECTING IMAGE DISTORTION CAUSED BY SCANNING

(75) Inventors: Tadashi Araki, Kanagawa-ken (JP); Maki Shinoda, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 841 days.

(21) Appl. No.: 11/054,396

(22) Filed: Feb. 10, 2005

(65) Prior Publication Data

US 2005/0175239 A1 Aug. 11, 2005

(30) Foreign Application Priority Data

Feb. 10, 2004 (JP) .............................. 2004-033634
Feb. 10, 2004 (JP) .............................. 2004-033635

(51) Int. Cl.
*G06K 9/00* (2006.01)
*G06K 9/34* (2006.01)
*G06K 9/46* (2006.01)
*G06K 9/66* (2006.01)
*G06T 5/00* (2006.01)
*H04N 1/407* (2006.01)
*H04N 1/409* (2006.01)
*H04N 1/38* (2006.01)

(52) U.S. Cl. ....................... 382/290; 382/101; 382/113; 382/176; 382/177; 382/190; 382/275; 382/282; 358/3.26; 358/463

(58) Field of Classification Search ....................... None
See application file for complete search history.

(56) References Cited

U.S. PATENT DOCUMENTS

| 5,757,957 | A | * | 5/1998 | Tachikawa | ................... 382/176 |
| 6,188,790 | B1 | * | 2/2001 | Yoshikawa et al. | .......... 382/194 |
| 6,658,166 | B1 | * | 12/2003 | Zlotnick et al. | ............. 382/282 |
| 2002/0084978 | A1 | * | 7/2002 | Araki et al. | ................... 345/156 |
| 2003/0113016 | A1 | * | 6/2003 | Naoi et al. | .................. 382/181 |
| 2003/0198398 | A1 |  | 10/2003 | Guan et al. |  |

FOREIGN PATENT DOCUMENTS

| JP | 08-044819 | | 2/1996 |
| JP | 2003-069807 | * | 3/2003 |

OTHER PUBLICATIONS

Japanese Office Action for Application No. 2004-033634 (1 page).

* cited by examiner

*Primary Examiner*—Matthew C Bella
*Assistant Examiner*—Nathan Bloom
(74) *Attorney, Agent, or Firm*—Dickstein Shapiro LLP

(57) ABSTRACT

An apparatus, system, method, and computer program product is disclosed, each capable of correcting distortion in a scanned image, using at least a character line extracted from the scanned image. The character line is extracted based on a circumscribed rectangle, representing the vertical component of the character. The distortion in the scanned image is corrected based on the length of the circumscribed rectangle in the main scanning direction.

24 Claims, 19 Drawing Sheets

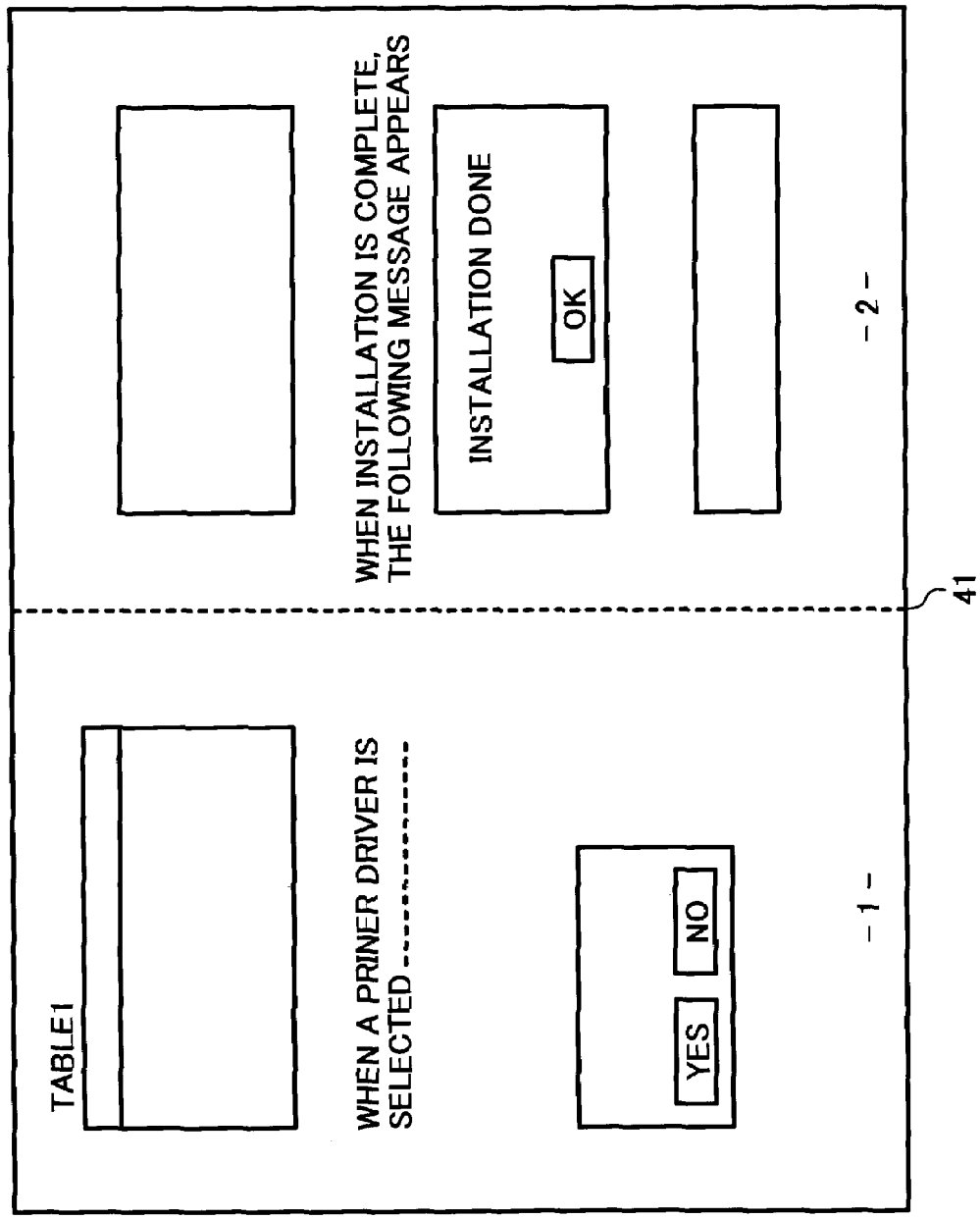

CORRECTING IMAGE DISTORTION CAUSED BY SCANNING

CROSS-REFERENCE TO RELATED APPLICATIONS

The present invention claims priority to Japanese patent application Nos. JPAP 2004-033634 filed on Feb. 10, 2004, and JPAP 2004-033635 filed on Feb. 10, 2004, in the Japanese Patent Office, the entire contents of which are hereby incorporated by reference.

FIELD OF THE INVENTION

The present invention relates to correcting image distortion, and more particularly to correcting image distortion caused by scanning.

DESCRIPTION OF THE RELATED ART

When a book document, such as a book or a booklet having a bound Boundary or spine, is placed on an exposure glass of a scanner, the book boundary often raises above the surface of the exposure glass. As a result, a scanned image having distortion in a portion corresponding to the book boundary may be generated.

In light of the above, the U.S. patent application Ser. No. 10/227,743 ("'743 patent application"), the entire contents of which are hereby incorporated by reference, corrects image distortion using a set of indexes including a page outline, a rule line, and a character line. However, the disclosed method faces some issues to be solved.

For example, as illustrated in FIGS. 1A and 1B, distortion in the sub-scanning direction is corrected based on the aspect ratio, that is, the ratio of the width to the length, of a minimal circumscribing rectangle formed around each character. If the aspect ratio is substantially equal to 1 as illustrated in FIG. 1A, the distortion in the sub-scanning direction X may be corrected with a high accuracy. However, if the aspect ratio is larger or smaller than 1 as illustrated in FIG. 1B, the correction accuracy may be lowered.

Further, to properly form a minimal circumscribing rectangle for each character, it is expected that characters are sufficiently separated from each other as illustrated in FIG. 2A. If characters are located closely to one another in the sub-scanning direction X as illustrated in FIG. 2B, a minimal circumscribing rectangle may not be properly formed.

Furthermore, the minimal circumscribing rectangles are used as a basis for determining a character line. If characters are located closely to one another in the main scanning direction Y as illustrated in FIG. 3, a character line may not be properly determined. In the exemplary case shown in FIG. 3, only one character line may be extracted as opposed to three character lines.

BRIEF SUMMARY OF THE INVENTION

Exemplary embodiments of the present invention provide an apparatus, system, method, and computer program product, each capable of correcting distortion in a scanned image in a suitable manner, even when a character having an aspect ratio larger or smaller than 1 is extracted.

For example, in on exemplary embodiment, an image distortion correction apparatus includes: a scanner configured to scan an original into a scanned image having a character; an image data processor connected to the scanner and configured to form a circumscribed rectangle for the character; and an image distortion corrector connected to the image data processor and configured to correct sub-scanning direction distortion in the scanned image, using a correction ratio determined based on the length of the circumscribed rectangle in the main scanning direction.

Another exemplary embodiments of the present invention provide an apparatus, system, method, and computer program product, each capable of extracting a character line in a suitable manner from a scanned image, even when characters are located closely to one another in the sub-scanning direction.

For example, in one exemplary embodiment, an image distortion correction apparatus includes: a scanner configured to scan an original into a scanned image having a character; an image data processor connected to the scanner and configured to form a circumscribed rectangle representing a vertical component of the character, and to extract a character line based on the circumscribed rectangle; and an image distortion corrector connected to the image data processor and configured to correct distortion in the scanned image by using the character line.

Another exemplary embodiments of the present invention provide an apparatus, system, method, and computer program product, each capable of extracting a character line in a suitable manner from a scanned image, even when characters are located closely to one another in the main scanning direction.

For example, in one exemplary embodiment, an image distortion correction apparatus includes: a scanner configured to scan an original into a scanned image having a character; an image data processor connected to the scanner and configured to form a circumscribed rectangle representing a vertical component of the character, to adjust the length of the circumscribed rectangle in the main scanning direction to be within a predetermined value, and to extract a character line based on the adjusted circumscribed rectangle; and an image distortion corrector connected to the image data processor and configured to correct distortion in the scanned image by using the character line.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 34 is the scanned image of FIG. 10, after distortion has been corrected.

DETAILED DESCRIPTION OF THE INVENTION

Figure 1A:
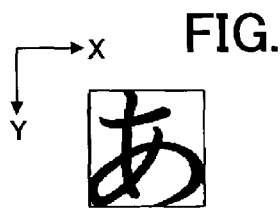
FIG. 1A is an illustration for explaining formation of a minimal circumscribing rectangle having the aspect ratio of about 1.
Figure 1B:
FIG. 1B is an illustration for explaining formation of a minimal circumscribing rectangle having the aspect ratio of larger or smaller than 1.
Figure 2A:
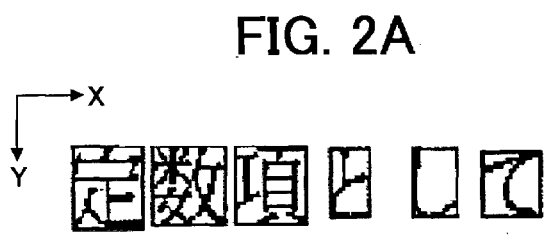
FIG. 2A is an illustration for explaining formation of a minimal circumscribing rectangle when characters are sufficiently separated from each other.
Figure 2B:
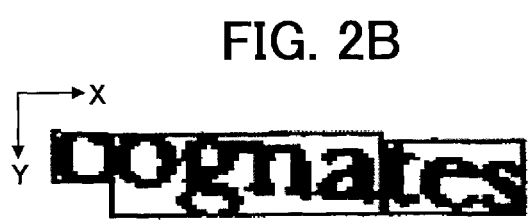
FIG. 2B is an illustration for explaining formation of a minimal circumscribing rectangle when characters are located closely to one another in the sub-scanning direction.
Figure 3:
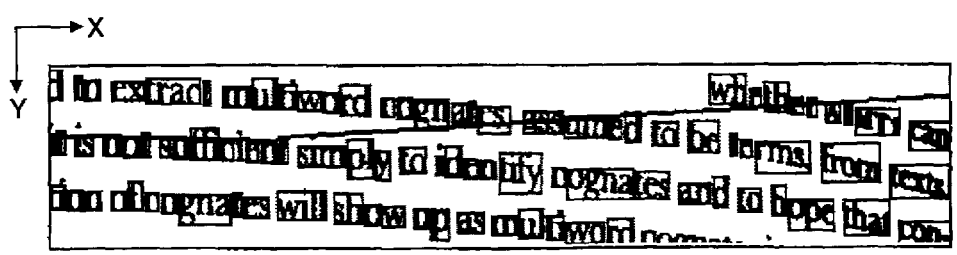
FIG. 3 is an illustration for explaining determination of a character line when characters are located closely to one another in the main scanning direction.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 4, a description is made of a scanner 1 according to a preferred embodiment of the present invention.

Figure 4:
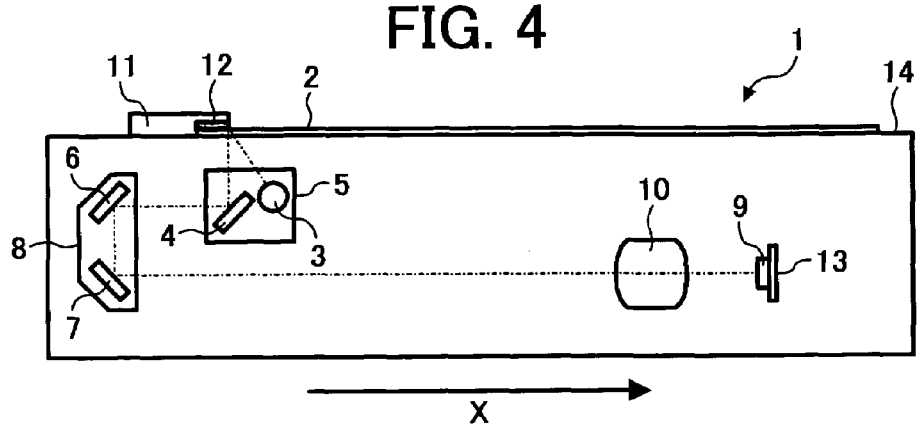
FIG. 4 is a diagram illustrating a cross sectional view of a scanner according to an embodiment of the present invention.
Figure 5:
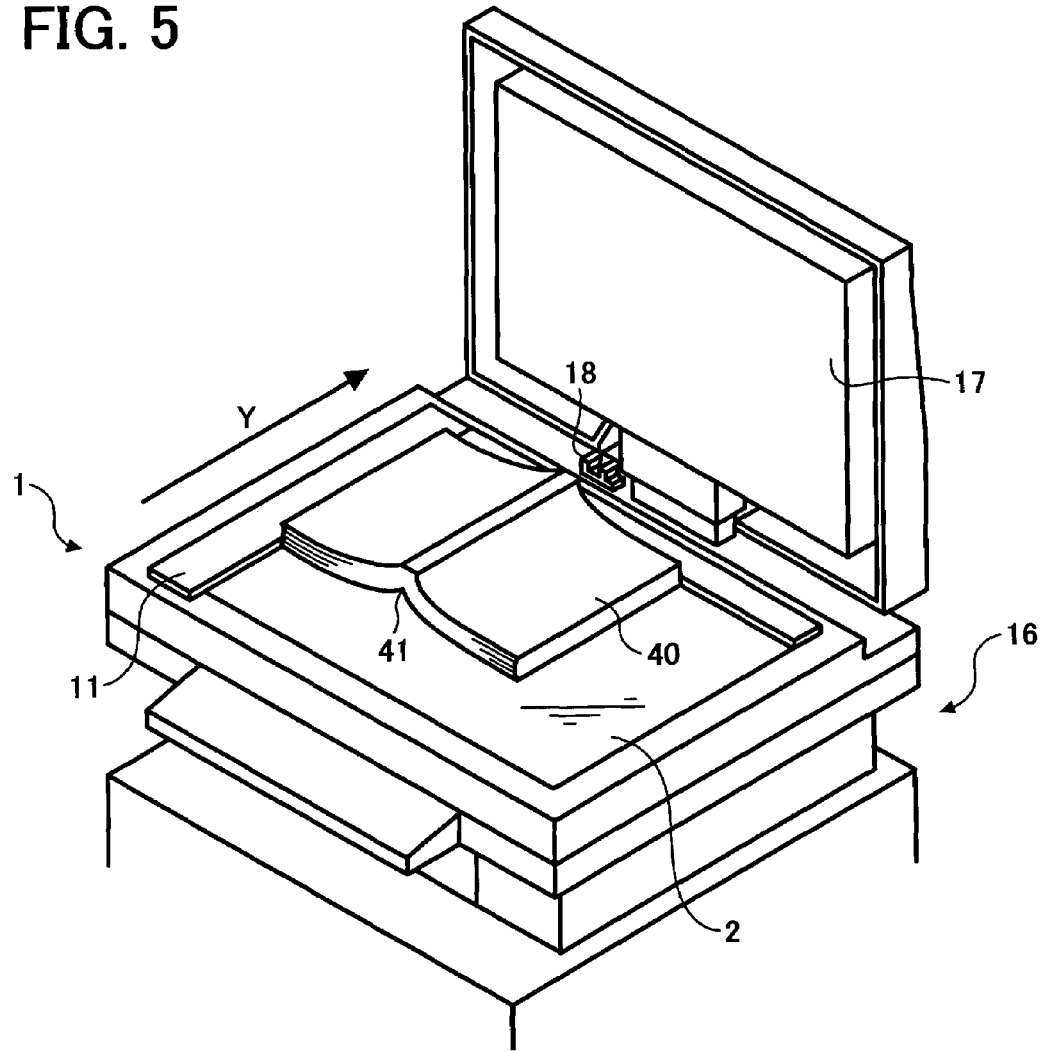
FIG. 5 is a diagram illustrating a perspective view of an upper portion of an image forming apparatus, with a book document placed thereon, according to an embodiment of the present invention.

The scanner 1 of FIG. 4 may include any kind of scanner or image reader, capable of correcting image distortion of an original. As shown in FIG. 5, if a book document 40 having a bound boundary 41 is scanned by the scanner 1, image distortion caused by scanning the bound boundary 41 may be corrected using the scanner 1.

As shown in FIG. 4, the scanner 1 includes an exposure glass 2, a first scanning body 5 having an exposing lamp 3 and a first reflection mirror 4, a second scanning body 8 having a second reflection mirror 6 and a third reflection mirror 7, a CCD (charged coupled device) 9, a lens 10, an original scale 11, a sensor board 13, and a frame 14.

To scan an original placed on the exposure glass 2, the first scanning body 5 and the second scanning body 8 move under the exposure glass 2, and direct a light emitted from the exposing lamp 3 to the original. The light reflected off the original is further reflected by the first reflection mirror 4, the second reflection mirror 6, and the third reflection mirror 7, toward the lens 10. The lens 10 forms an image on the CCD 9 according to the reflected light. The CCD 9 converts the formed image to image data.

The scanner 1 may be provided with a printer (not shown) to together function as an image forming apparatus, such as a digital copier 16 illustrated in FIG. 5. A press cover 17 opens or closes over the exposure glass 2. An open/close sensor 18 detects the opening or closing position of the press cover 17. The printer of the digital copier 16 may form a toner image on a recording sheet based on the image data generated by the scanner 1.

Figure 6:
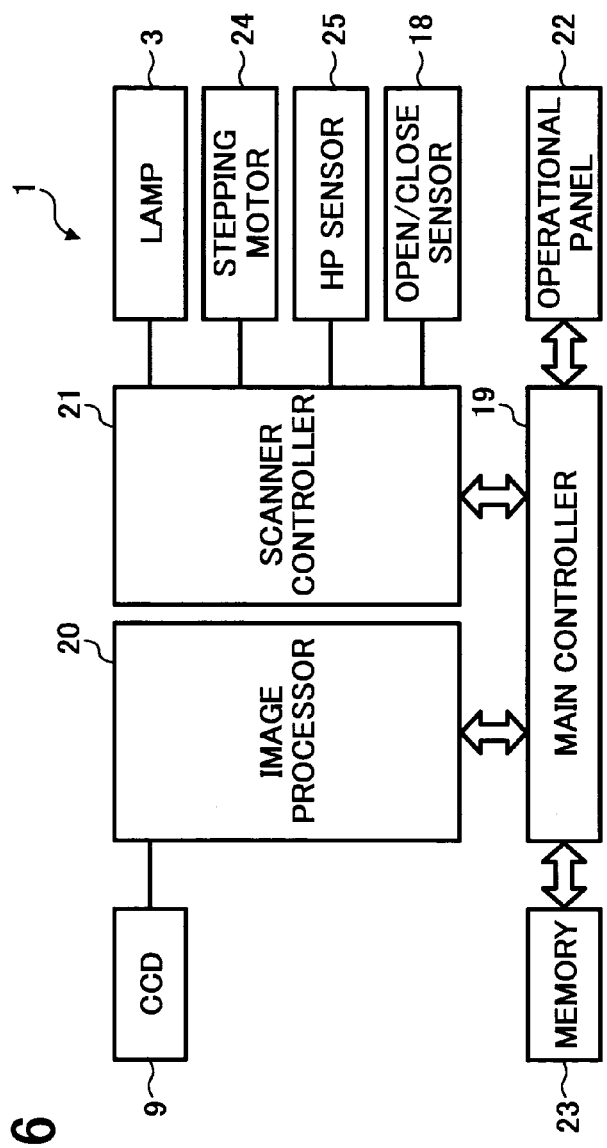
FIG. 6 is a block diagram illustrating basic components of the scanner of FIG. 1.

FIG. 6 is a block diagram illustrating the basic components of the scanner 1. A main controller 19 controls an entire operation of the scanner 1. The main controller 19 is connected to an image processor 20, a scanner controller 21, an operational panel 22, and a memory 23. The image processor 20 applies image processing to the image data generated by the CCD 9. The scanner controller 21 controls the first scanning body 5 and the second scanning body 8. The operational panel 22 displays a message from the digital copier 16, or allows a user to input an instruction to the digital copier 16. The memory 23 stores various data, including image data received from the CCD 9. The scanner controller 21 is connected to the exposing lamp 3, a stepping motor 24, a HP (home position) sensor 25, and the open/close sensor 18. The stepping motor 24 drives the first scanning body 5 and the second scanning body 8. The home position sensor 25 detects whether the first scanning body 5 or the second scanning body 8 is at a predetermined home position.

Figure 7:
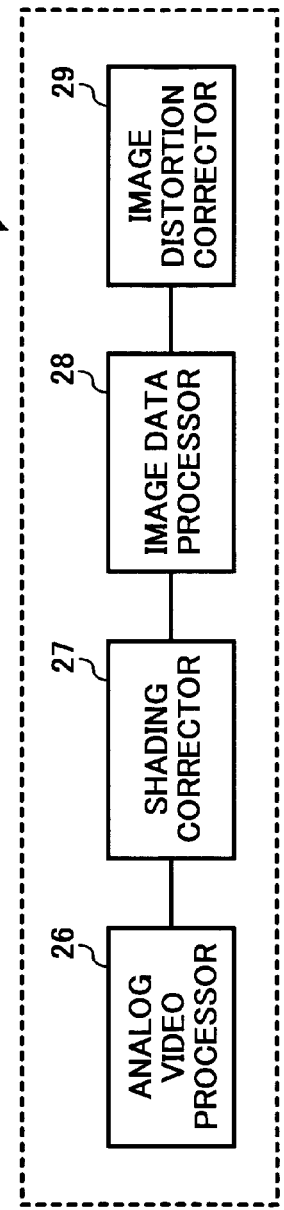
FIG. 7 is a block diagram illustrating basic components of an image processor shown in FIG. 6.

Referring now to FIG. 7, an exemplary structure of the image processor 20 is explained. The image processor 20 includes an analog video processor 26, a shading corrector 27, an image data processor 28, and an image distortion corrector 29. The analog video processor 26 performs amplification and digital conversion on the image data, which is analog, received from the CCD 9. The shading corrector 27 performs shading correction. The image data processor 28 performs image processing on the digital image data according to the present invention. The image data processor 28 may perform other image processing, including MTF correction, gamma correction and variable sizing, etc. The image distortion corrector 29 corrects distortion in the image data, according to the present invention. The digital image data, which has been processed by the image processor 20, is sent to the printer via the main controller 19 for image formation.

Figure 8:
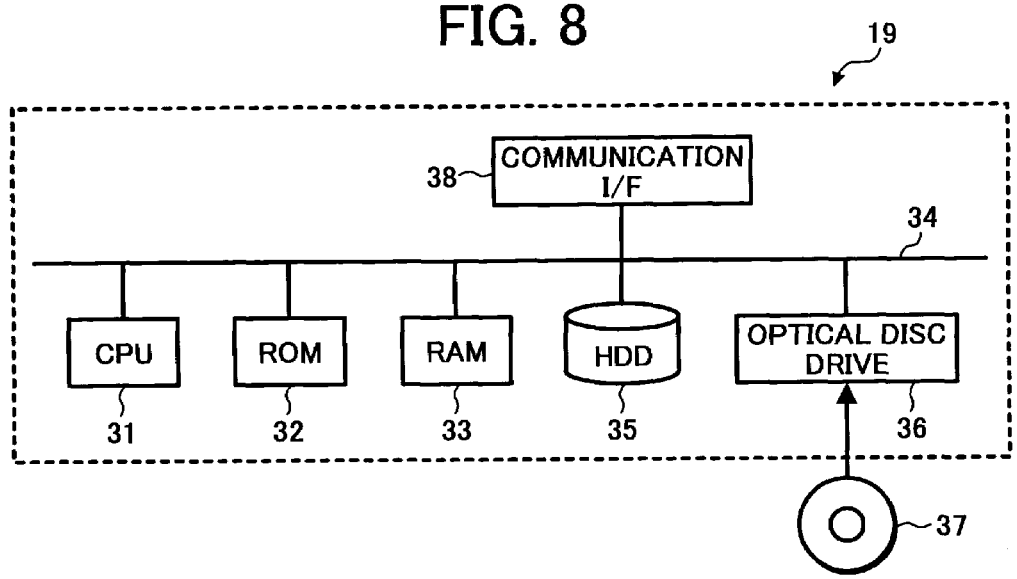
FIG. 8 is a block diagram illustrating basic components of a main controller shown in FIG. 6.

FIG. 8 illustrates an exemplary structure of the main controller 19. The main controller 19 includes a CPU (central processing unit) 31 for controlling an entire operation of the main controller 19. The CPU 31 is connected via a bus 34 to a ROM (read only memory) 32 for storing BIOS (basic input output system), and a RAM (random access memory) 33 for storing various data in an erasable manner to function as a work area. According to the present invention, the CPU 31, the ROM 32, and the RAM 33 together function as a microprocessor or any other kind of processor, operating according to the present invention.

The bus 34 is further connected to a HDD (hard disk drive) 35 for storing various programs including a control program of the present invention, an optical disc drive 36 for reading data from an optical disc 37, and a communication I/F (interface) 38 for communicating with other devices or apparatus. The optical disc 37 includes any kind of storage medium, such as CDs, DVDs, or magnetic disks, capable of storing at least the control program of the present invention.

According to the present invention, the HDD 35, the optical disc drive 36, and the communication I/F 38 together function as a storage device, storing the control program of the present invention. In one example, the CPU 31 may read the control program stored in the optical disc 37 using the optical disc drive 36, and install it on the HDD 35. In another example, the CPU 31 may download the control program from a network, such as the Internet, through the communication I/F 38, and install it on the HDD 35. When downloading, a storage device storing the control program functions as a storage medium of the present invention.

The control program may be operated on a predetermined operating system (OS), or may be included as a part in a group of files implementing an application software program such as a word processing program or the OS.

Figure 9:
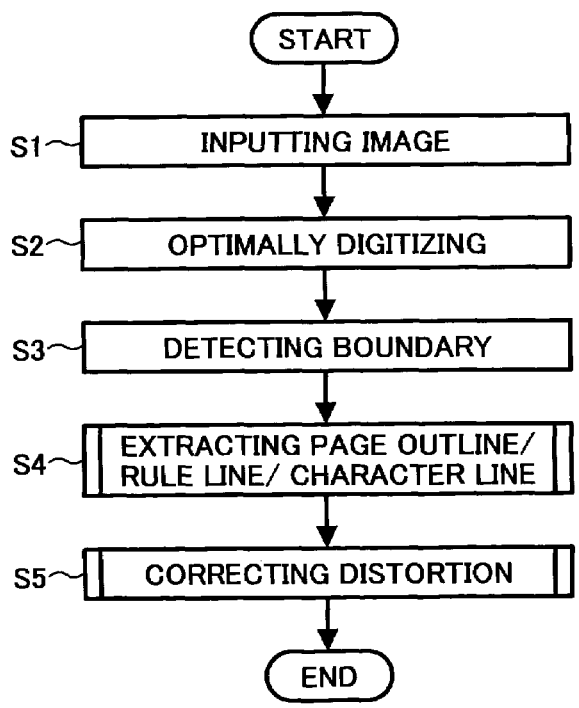
FIG. 9 is a flowchart illustrating image distortion correction, performed by the scanner 1, according to an embodiment of the present invention.

The CPU 31 of the main controller 19 performs various processing according to the control program. Referring now to FIG. 9, image distortion correction, performed by the main controller 19, is explained according to an exemplary embodiment of the present invention.

In this exemplary case, it is assumed that the bound boundary 41 of the book document 40 is placed on the exposure glass 2 in parallel to the main scanning direction Y of the scanner 1, as illustrated in FIG. 5. When the operational panel 22 receives an instruction for scanning or copying, for example, the CCD 9 generates image data of the corresponding pages of the book document 40. The image data is then provided to the image processor 20 for image processing in Step S1.

Figure 10:
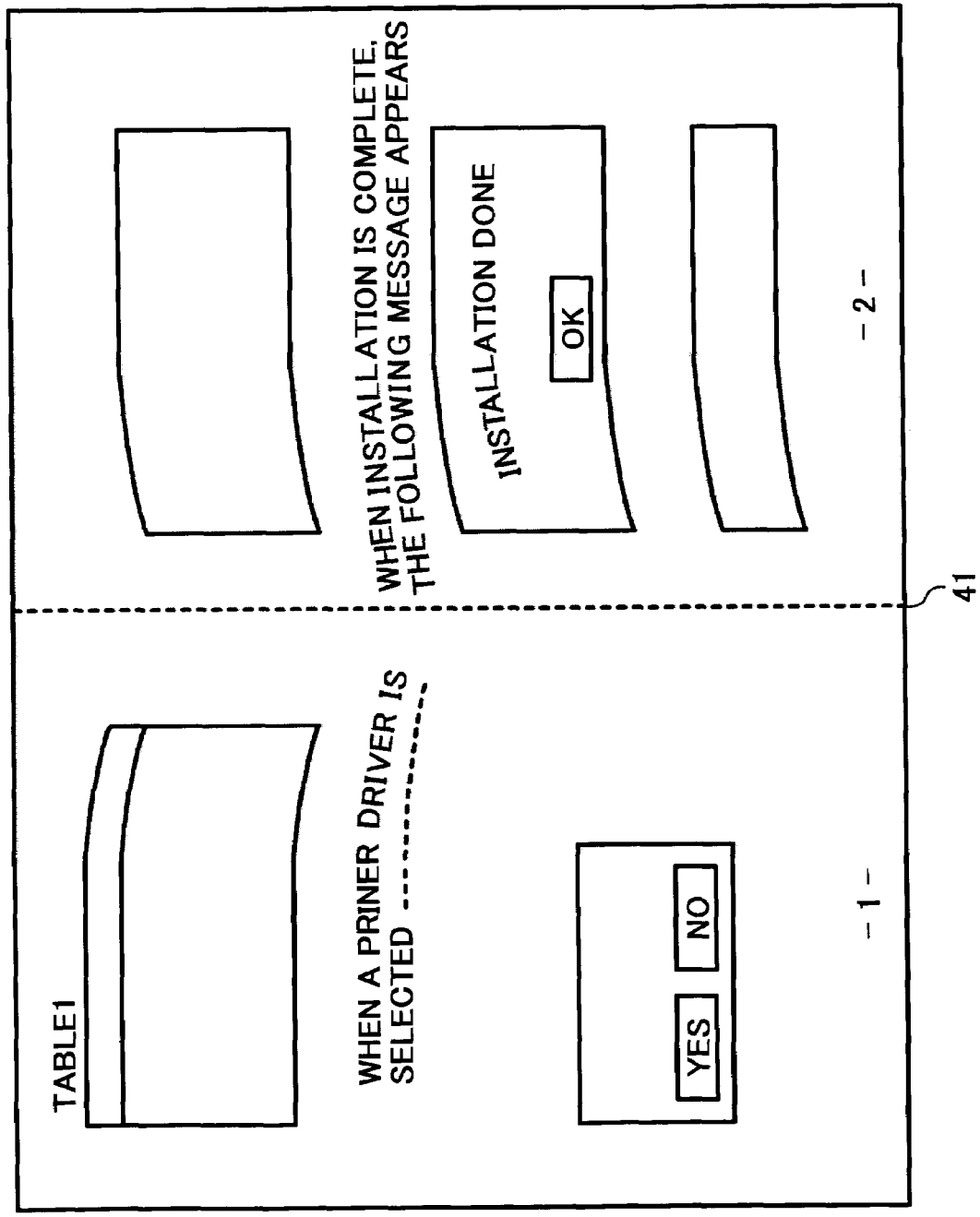
FIG. 10 is an exemplary scanned image to be corrected by the scanner 1.

The image data may be a binary image or a multivalue image, and may include various types of information. For simplicity, the image data is referred to as the "scanned image" in the following examples. Further, the scanned image is assumed to have distortion near a portion corresponding to the bound boundary 41, as illustrated in FIG. 10.

Step S2 applies optimal digitizing to the scanned image.

Step S3 detects the location in the scanned image, corresponding to the bound boundary 41. Specifically, in this exemplary case, Step S3 generates a histogram indicating a number of black pixels located in each location of the sub-scanning direction X. In the case of using the multivalue color image, one of the primitive colors such as red, green or blue may be selected, and a black pixel may be defined based on a predetermined threshold value. Alternatively, the multivalue color image may be converted to a chromatic portion and a luminance portion, and the luminance portion may be used to define black pixels.

Step S4 extracts any one of a page outline, a rule line, and a character line, from the scanned image. The page outline specifies the edges of the scanned image. The rule line specifies arrangement of rule lines. The character line specifies arrangement of characters.

Step S5 corrects distortion in the scanned image caused by the bound boundary 41, using any one of the page outline, the rule line and the character line, extracted in Step S4.

Figure 11:
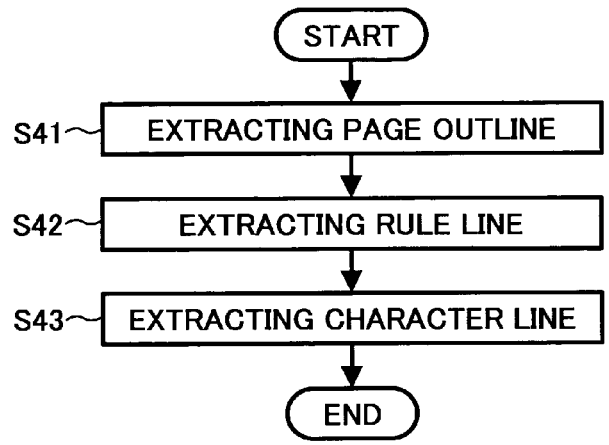
FIG. 11 is a flowchart illustrating further steps involved in the extracting step of FIG. 9.

Referring now to FIG. 11, Step S4 of extracting is explained according to an exemplary embodiment of the present invention.

Step S41 extracts a page outline from the scanned image. The scanned image is first divided into right and left pages based on the detected location of the bound boundary 41. A page outline is then extracted from each of the pages, using the page outline determination function described in the '743 patent application.

If the page outline is extracted, information regarding the page outline, such as its relative location on the scanned image, is temporarily stored in the RAM 33. If the page outline is not extracted, information indicating that no page outline has been extracted is temporarily stored in the RAM 33. Further, in this step, an inappropriately extracted page outline may be eliminated, for example, such as the page outline located too close to the edge of the scanned image.

Figure 12:
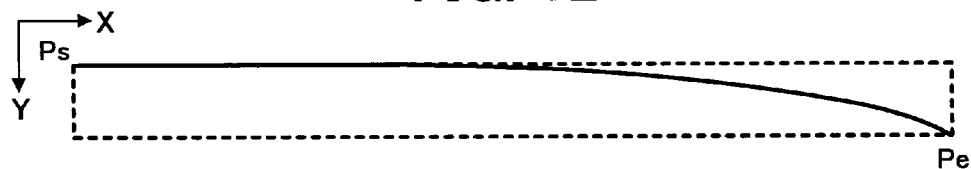
FIG. 12 is an illustration for explaining formation of a rule line rectangle, according to an embodiment of the present invention.

Step S42 extracts a rule line from the scanned image. For example, as illustrated in FIG. 12, it is first determined whether a continuous run of black pixels ("black pixel run") exists in the scanned image. If the black pixel run is detected, a rule line rectangle, determined by the start point Ps and the end point Pe of the detected run, is formed. Based on this rule line rectangle, a rule line can be extracted by a line approximation or a polynomial approximation, for example.

Figure 13A:
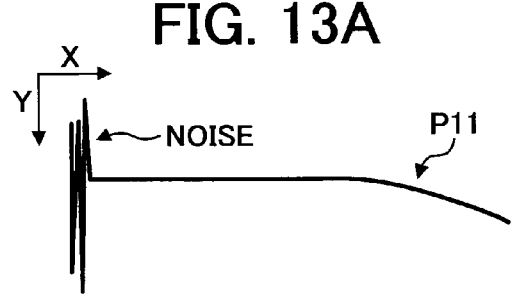
FIG. 13A is an illustration showing an exemplary black pixel run having noise.
Figure 13B:
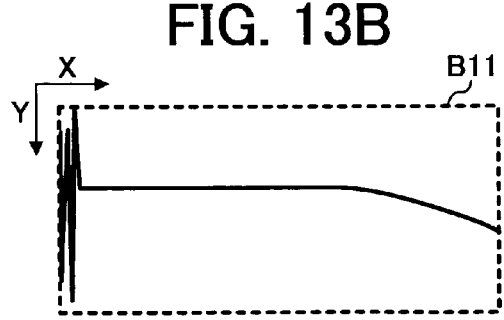
FIG. 13B is an illustration showing an exemplary rule line rectangle inappropriately formed for the black pixel run of FIG. 13A.

However, a rule line rectangle may not be properly formed for some cases. FIG. 13A illustrates an exemplary case of having noise data near a black pixel run P11. In this case, a rule line rectangle B11 having a length longer in the main scanning direction Y may be extracted, as illustrated in FIG. 13B.

Figure 14A:
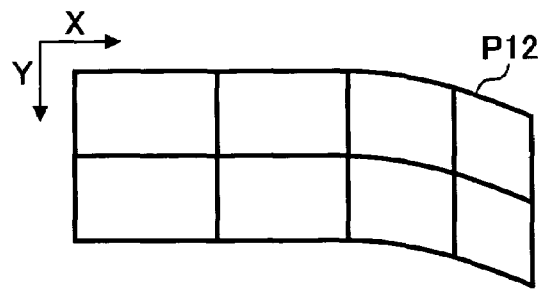
FIG. 14A is an illustration showing an exemplary black pixel run representing a table.
Figure 14B:
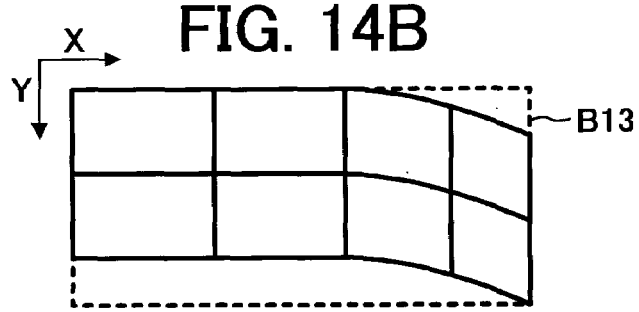
FIG. 14B is an illustration showing an exemplary rule line rectangle inappropriately formed for the black pixel run of FIG. 14A.

FIG. 14A illustrates an exemplary case of having a black pixel run P12 representing a table in the scanned image. In this exemplary case, three rule lines, each overlapping with each of the horizontal lines of the black pixel run P12, are supposed to be extracted. However, in some cases, only one rule line may be extracted if only one rule line rectangle B13 is formed as illustrated in FIG. 14B.

Figure 13C:
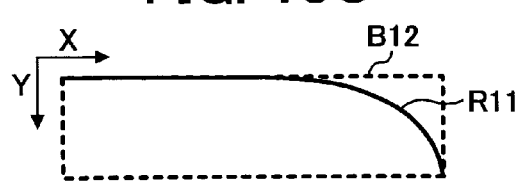
FIG. 13C is an illustration showing an exemplary rule line rectangle appropriately formed for the black pixel run of FIG. 13A.

To prevent such improper rectangle formation, only a black pixel run having a selected ranged length in the main scanning direction Y may be extracted. The selected ranged length may be previously defined depending on various characteristics of the scanner 1, such as its resolution, for example. In this way, the noise portion shown in FIG. 13A, having a black pixel run that is relatively long in the main scanning direction Y, can be eliminated. Thus, a rule line rectangle B12, corresponding to the black pixel run P11, may be properly formed as illustrated in FIG. 13C. Based on the rectangle B12, a rule line R11 is extracted.

Figure 14C:
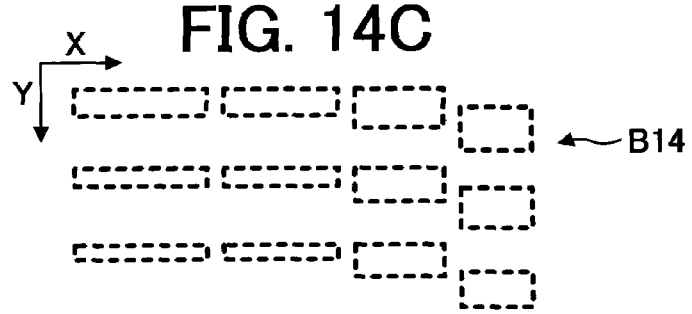
FIG. 14C is an illustration showing exemplary rule line rectangles appropriately formed for the black pixel run of FIG. 14A.
Figure 14D:
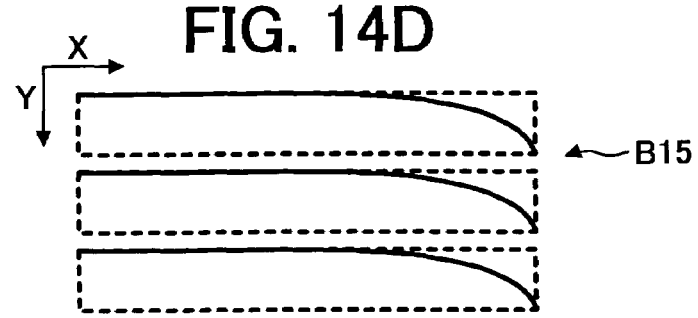
FIG. 14D is an illustration for explaining combining the rule line rectangles of FIG. 14C.

In the exemplary case shown in FIG. 14A, if only a black pixel run having a selected ranged length in the main scanning direction Y is extracted, a plurality of smaller rectangles B14 may be formed as shown in FIG. 14C. In such a case, the rectangles B14 arranged in the same horizontal line may be further combined into one rectangle B15, as illustrated in FIG. 14D. Based on the rectangle B15, a rule line is extracted.

Figure 15:
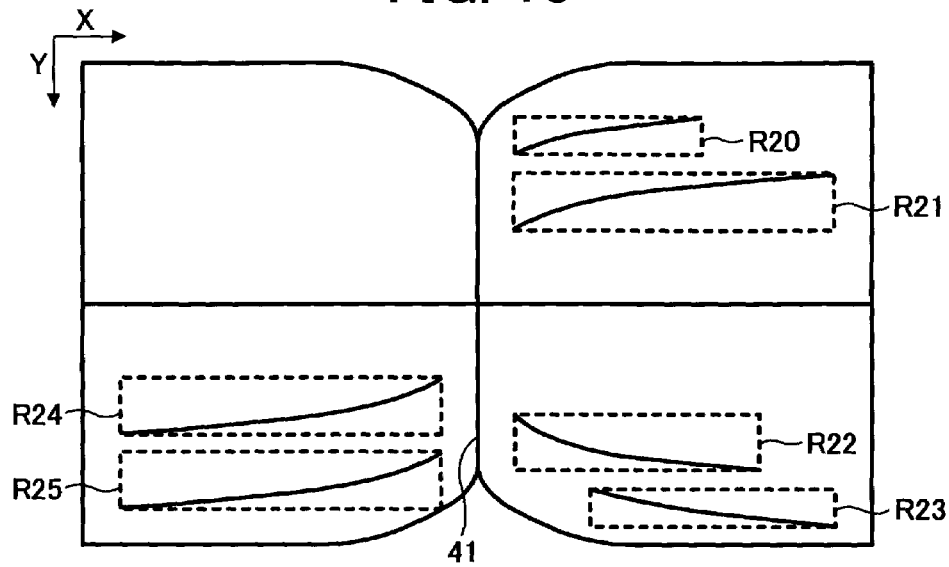
FIG. 15 is an illustration showing an exemplary situation where a plurality of rule lines is extracted.

The above-described rule line extraction may be performed for an entire portion of the scanned image, or it may be performed for each of the sections of the scanned image. For example, the scanned image may be further divided into four sections, including an upper left section, an upper right section, a bottom left section, and a bottom right section, as illustrated in FIG. 15. In the scanned image shown in FIG. 15, two rule lines R20 and R21 are extracted from the upper right section. Two rule lines R22 and R23 are extracted from the bottom right section. Two rule lines R24 and R25 are extracted from the bottom left section. No rule lines are extracted from the upper left section.

When a plurality of the rule lines exists in the same section as shown in FIG. 15, an optimal rule line may be selected, based on one of the rule line selection standards disclosed in the '743 patent application.

For example, the optimal rule line may be selected based on whether it has a longer length, whether it is closer to the bound boundary 41, or whether it is closer to the edge of the scanned image. If such a selection standard is applied to the exemplary case shown in FIG. 15, the rule line R21 is selected for having a length longer than that of the rule line R20. The rule line R22 is selected for being closer to the bound boundary 41, when compared to the rule line R23. The rule line R25 is selected for being closer to the bottom edge of the scanned image, when compared to the rule line R24.

At the same time, an inappropriately extracted rule line may be eliminated, such as a rule line located too close to the edge of the scanned image. The examples of inappropriately extracted rule lines are described referring to FIG. 21 of the '743 patent application. Further, when a rule line rectangle positioned in the left page and a rule line rectangle positioned in the right page have been combined into one rectangle crossing the bound boundary 41, and a rule line is formed based on the combined rectangle, the rule line is again divided into two rule lines based on the bound boundary 41.

The extracted rule line, preferably the one selected as the optimal rule line, may be further adjusted by a line approximation or a polynomial curve approximation, in a substantially similar manner as described in the '743 patent application.

If the rule line is extracted in the above-described manner, information regarding the rule line, such as its relative location in the scanned image, is temporarily stored in the RAM 33. If the rule line is not extracted, information indicating that no rule line has been extracted is temporarily stored in the RAM 33.

Referring back to FIG. 11, Step S43 extracts a character line from the scanned image. First, one or more characters arranged in the same line are extracted from the scanned image. It is then determined whether the characters are oriented vertically or horizontally, using the character determination function disclosed in the '743 patent application.

Figure 16A:
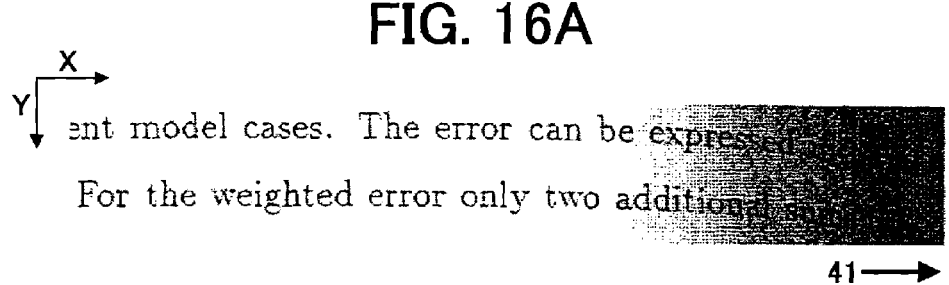
FIG. 16A is an illustration showing an exemplary situation where characters are oriented horizontally.
Figure 16B:
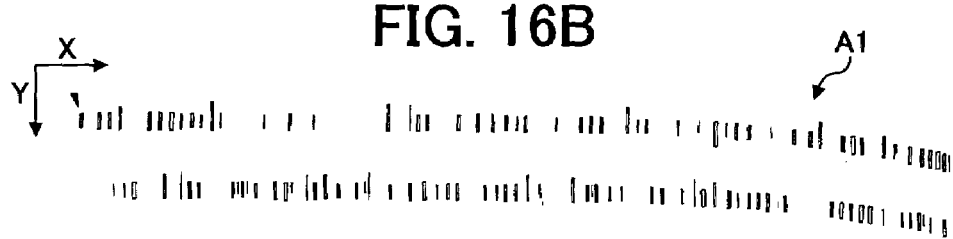
FIG. 16B is an illustration for explaining forming a circumscribed rectangle for each of the characters of FIG. 16B.

If the characters are oriented horizontally as in the case shown in FIG. 16A, a circumscribed rectangle A1 is formed for each of the characters oriented horizontally as illustrated in FIG. 16B.

To form the circumscribed rectangle, which represents a vertical component of the character, it is first determined whether a black pixel run having a selected ranged length in the main scanning direction Y exists. The selected ranged length may be previously determined based on various characteristics of the scanner 1, such as its resolution, for example. If the black pixel run having the selected ranged length exists, a circumscribed rectangle is formed based on the detected run.

Figure 17:
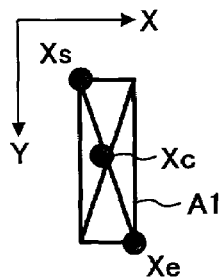
FIG. 17 is an illustration for explaining adjusting the length of a circumscribed rectangle in the main scanning direction.

The length of the circumscribed rectangle in the main scanning direction Y may be further adjusted, when it is determined that the circumscribed rectangles locate closely to each other in the main scanning direction Y. Referring to FIG. 17, the point Xs corresponds to the Y coordinate where the circumscribed rectangle A1 starts. The point Xe corresponds to the Y coordinate where the circumscribed rectangle A1 ends. The point Xc corresponds to the Y coordinate of a central point of the distance between the line connecting the points Xs and Xe. The length of the circumscribed rectangle A1 in the main scanning direction Y is reduced while maintaining the ratio of the length between the points Xs and Xc and the length between the points Xc and Xe.

Figure 18A:
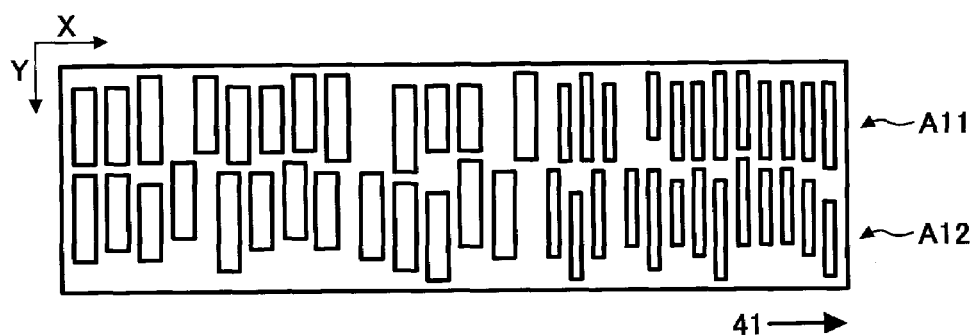
FIG. 18A is an illustration for explaining extraction of a character line, without adjusting the length in the main scanning direction.

For example, in the scanned image shown in FIG. 18A, a first set of circumscribed rectangles A11 arranged at the upper horizontal line is located relatively closely to a second set of circumscribed rectangles A12 arranged at the bottom horizontal line. In such a case, only one character line may be formed based on the first and second sets of rectangles A11 and A12, instead of forming two character lines.

Figure 18B:
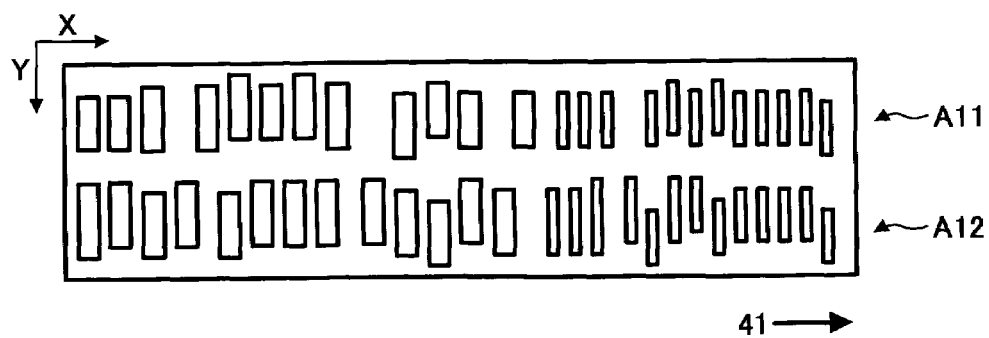
FIG. 18B is an illustration for explaining extraction of a character line, after adjusting the length in the main scanning direction.

In FIG. 18B, which illustrates the scanned image after the adjustment of FIG. 17 has been applied, the first and second sets of circumscribed rectangles A11 and A12 are sufficiently separated from each other. Thus, two character lines can be properly formed.

When a plurality of character lines are extracted in the same section of the scanned image, an optimal character line may be selected for distortion correction, using one of the character line selection standards disclosed in the '743 patent application. For example, the optimal character line may be selected based on whether it has a longer length, whether it is closer to the bound boundary 41, or whether it is closer to the edge of the scanned image.

At the same time, an inappropriately extracted character line may be eliminated, such as a character line having a length shorter than a predetermined length. The other examples of inappropriately extracted character lines are described in the '743 patent application.

Figure 19:
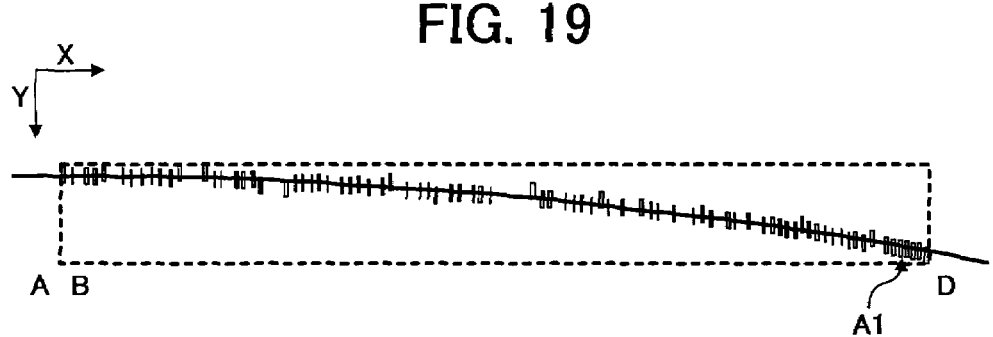
FIG. 19 is an illustration for explaining approximation of a character line.

The extracted character line, preferably the one selected as the optimal character line, may be further adjusted by a line approximation or a polynomial curve approximation. For example, as illustrated in FIG. 19, the central points (the point Xc in FIG. 17) of the respective circumscribed rectangles A1 in the selected character line are connected to form a curved line within the rule line rectangle. The curved line may be further extended to the point A toward the edge, or to the point D toward the bound boundary 41. From the point A to B, the Y coordinates of the rule line are determined by a line approximation. From the point B to D, the Y coordinates of the rule line are determined by a polynomial curve approximation.

If the character line is extracted from the characters oriented horizontally in the above-described manner, information regarding the character line, such as its relative location in the scanned image, is temporarily stored in the RAM 33. If the character line is not extracted, information indicating that no character line has been extracted is temporarily stored in the RAM 33.

Figure 20:
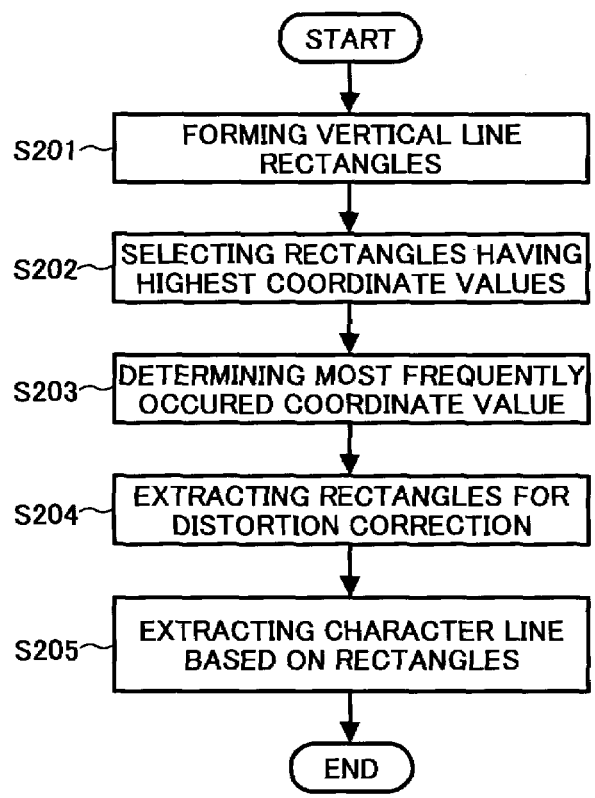
FIG. 20 is a flowchart illustrating character line extraction when characters are oriented vertically.

Referring back to FIG. 11, if Step S43 determines that the characters are oriented vertically, the steps illustrated in FIG. 20 may be performed for character line extraction.

Figure 21:
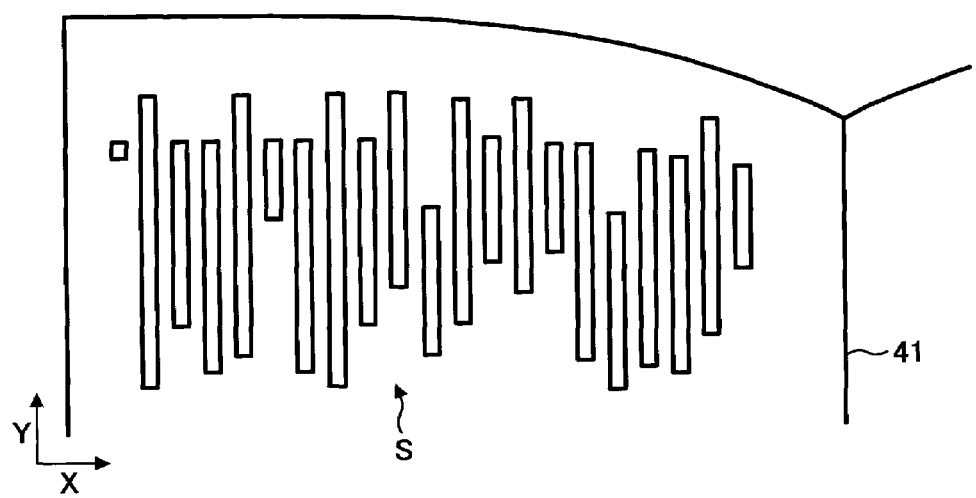
FIG. 21 is an illustration for explaining formation of a vertical line rectangle.

Step S201 forms a plurality of vertical line rectangles S from the scanned image, as illustrated in FIG. 21. The vertical line rectangle S includes one or more characters oriented vertically in the same vertical line. In this step, a circumscribed rectangle A1 may be formed for each of the characters, in a substantially similar manner as described in the operation of extracting the horizontal character line.

Figure 22:
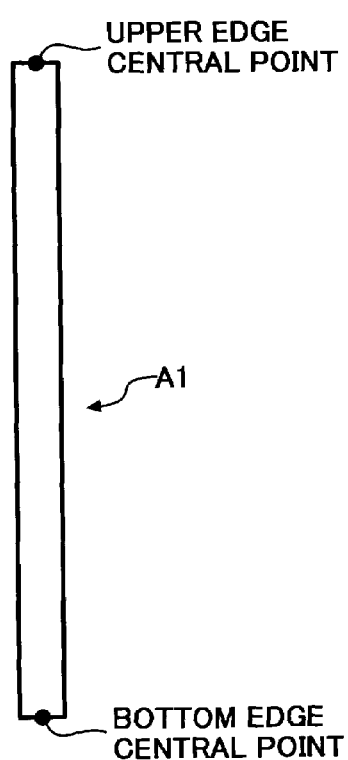
FIG. 22 is an illustration for explaining an exemplary structure of a vertical line rectangle.

Step S202 selects a set of vertical line rectangles, each having a Y coordinate value within a selected highest range, from the plurality of vertical line rectangles S. The Y coordinate value refers to a Y coordinate value of the upper edge central point of the circumscribed rectangle A1 arranged at the top of the vertical line rectangle S, as illustrated in FIG. 22, for example. Alternatively, the Y coordinate value may refer to a Y coordinate value of the bottom edge central point of the circumscribed rectangle A1.

Figure 23:
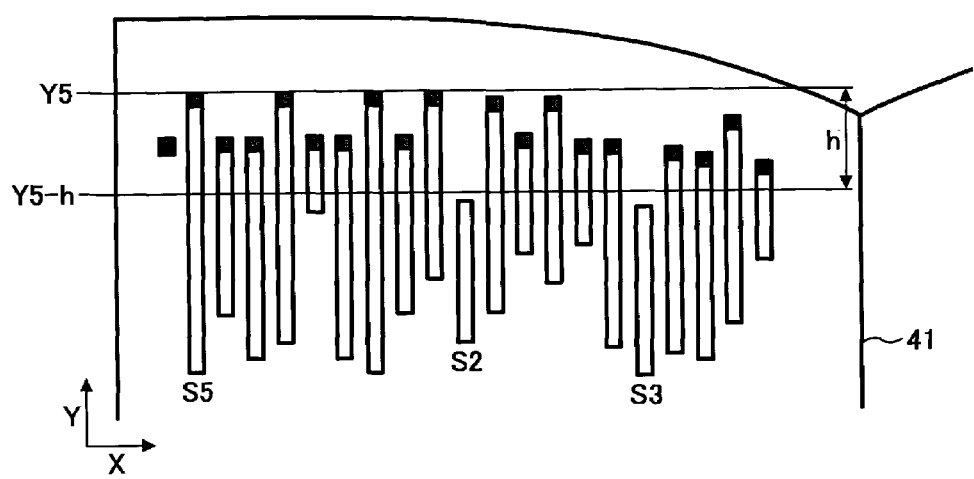
FIG. 23 is an illustration for explaining selection of rectangles having highest main scanning coordinate values.

Referring to FIG. 23, the vertical line rectangle S5, having the largest Y coordinate value Y5, is selected. Based on the value Y5, the vertical line rectangle having the Y coordinate value between the value (Y5−h) and the value Y5, is further selected. The value h may be previously specified, depending on various characteristics of the scanner 1, such as its resolution, for example. In the exemplary case of FIG. 23, all vertical line rectangles, other than the rectangles S2 and S3, are selected.

Step S203 generates a histogram for the Y coordinate values of the selected rectangles, to determine which of the Y coordinate values occurs most frequently.

Figure 24:
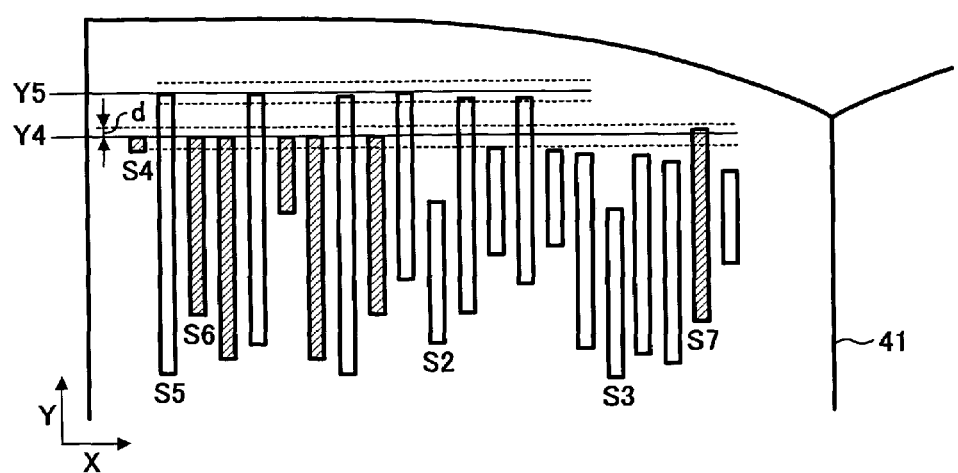
FIG. 24 is an illustration for explaining determination of most frequently occurred main scanning coordinate value.

In the exemplary case of FIG. 24, the Y coordinate value Y4 of the rectangle S4 is selected as a first class. Next, it is determined whether the rectangle S5, located next to the rectangle S4, has a Y coordinate value in a selected range between the value (Y4−d) and the value (Y4+d). In this example, the value d is previously determined based on various characteristics of the scanner 1, such as its resolution, for example. Preferably, the value d is half of the average value of the widths (lengths in the sub-scanning direction) of the vertical line rectangles being extracted. Since the Y coordinate value Y5 of the rectangle S5 is out of the selected range, a second class is created for the value Y5.

In a substantially similar manner, it is determined whether the Y coordinate value of the rectangle S6 is within the selected range between the value (Y4−d) and the value (Y4+d). Since the Y coordinate value of the rectangle S6 is within the selected range, the number of points in the first class increases from one to two.

After repeating the above-described process for each of the rectangles being extracted, the most frequently occurred Y coordinate value is determined. In this exemplary case, the value Y4 occurs most frequently as shown in the hatched areas of FIG. 24.

Step S204 selects a set of vertical line rectangles, each having a Y coordinate value within a range determined by the most frequently occurred Y coordinate value, for distortion correction.

To select a vertical line rectangle for image distortion, a distorted portion of the scanned image is first detected. The distorted portion may be determined based on the difference in the Y coordinate values.

For example, assuming that a first vertical line rectangle having the Y coordinate Y1 and a second vertical line rectangle having the Y coordinate Y2 are adjacent to each other. If the difference between the coordinates Y1 and Y2 is equal to or larger than a selected threshold value, the first and second rectangles are considered to be in the distorted portion of the scanned image. If the difference between the coordinates Y1 and Y2 is less than the selected threshold value, they are considered to be in the undistorted portion. The selected threshold value may be previously determined based on characteristics of the scanner 1, such as its resolution, for example. Preferably, the selected threshold value is substantially equal to ¼ of the average of the widths of the rectangles being extracted.

After determining the distorted portion and the undistorted portion in the scanned image, a rectangle for distortion correction is selected from each of the distorted portion and the undistorted portion.

To select a vertical line rectangle from the undistorted portion, a rectangle that has the most frequently occurred Y coordinate value and is located most far from the bound boundary 41 is first selected as a reference rectangle. Based on the reference rectangle, any rectangle that meets a predetermined selection standard is selected for distortion correction.

Figure 25:
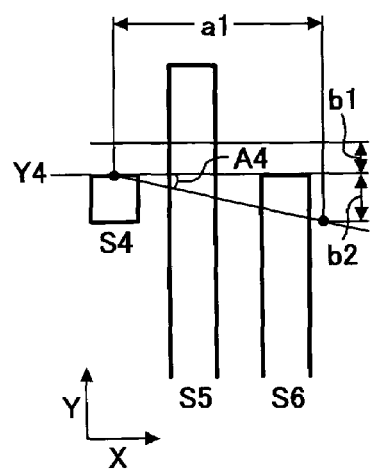
FIG. 25 is an illustration for explaining extraction of vertical line rectangles for distortion correction from an undistorted portion of a scanned image.

For example, referring to FIG. 25, the rectangle S4, having the Y coordinate value Y4, is selected as a reference rectangle. The rectangle S6 is selected as a target rectangle under consideration. It is determined if the rectangle S6 meets one of the following standards 1 and 2. If the rectangle S6 meets one of the standards 1 and 2, it is selected for distortion correction.

In the standard 1, the rectangle S6 is selected if it has a Y coordinate value within the range between the value Y4 and the value (Y4+b1). The value b1 is previously determined based on various characteristics of the scanner 1, such as its resolution. Preferably, in this exemplary case, the value half of the average value of the widths of the rectangles is used.

In the standard 2, the rectangle S6 is selected if it has a Y coordinate value within the range between the value Y4 and the value (Y4−b2). The value b2 is specified by a predetermined angle A4. As shown in FIG. 25, the value b2 increases as the location of the rectangle becomes closer to the bound boundary 41.

Based on one of the above-described standards, the rectangle S6 is selected. This selection process is repeated for all the rectangles in the undistorted portion.

To select a rectangle from the distorted portion, a rectangle, located most far from the bound boundary 41 in the distorted portion, is selected as a reference rectangle. Based on the reference rectangle, any rectangle that meets a predetermined selection standard is selected for distortion correction.

Figure 26:
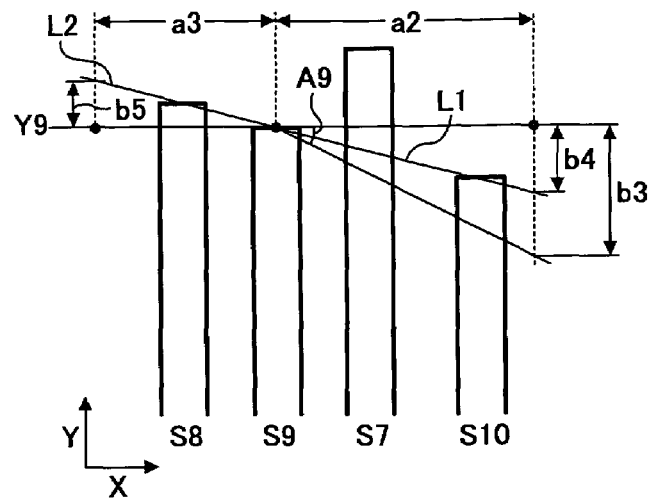
FIG. 26 is an illustration for explaining extraction of vertical line rectangles for distortion correction from a distorted portion of a scanned image.

For example, referring to FIG. 26, the rectangle S9, having the Y coordinate value Y9, is selected as a reference rectangle. The rectangle S10 is selected as a target rectangle under consideration. It is determined if the rectangle S10 meets one of the following standards 3 and 4. If the rectangle S10 meets one of the standards 3 and 4, it is selected for distortion correction.

In the standard 3, the rectangle S10 is selected if it has a Y coordinate value within the range between the value Y9 and the value (Y9−b3). The value b3 is specified by a predetermined angle A9. As shown in FIG. 26, the value b3 increases as the location of the rectangle becomes closer to the bound boundary 41. Further, the angle A9 is preferably larger than the angle A4, due to the image distortion.

In the standard 4, the rectangle S10 is selected if the line L1 connecting the value Y9 and the Y coordinate value of the rectangle S10 has a slope larger than the slope of the line L2 connecting the value Y9 and the Y coordinate value of the rectangle S8, located next to the rectangle S9 in the direction toward the edge. As shown in FIG. 26, the line L1 has the slope b4/a2, which is larger than the slope b5/a3 of the line L2.

Based on one of the above-described standards, the rectangle S10 is selected. This selection process is repeated for all the rectangles in the distorted portion.

The above-described selection process may consider an amount of error e. For example, in the standard 4, the rectangle S10 may be selected when the slope b4/a2 of the line L1 is larger than the slope (b5/a3−e) of the line L2.

Figure 27:
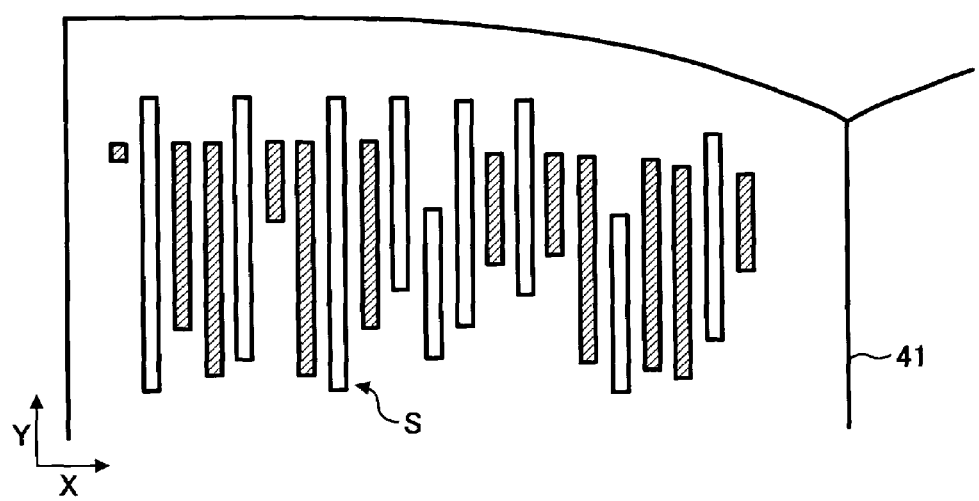
FIG. 27 is an illustration showing vertical line rectangles extracted for distortion correction from the scanned image of FIG. 21.

FIG. 27 illustrates a set of vertical line rectangles (shown in hatched areas) selected in Step S204.

Step S205 extracts a character line, using the top circumscribed rectangles of the selected vertical line rectangles.

Referring back to FIG. 22, if the Y coordinate of the vertical line rectangle refers to the upper edge central point of the top circumscribed rectangle, the Y coordinates of the selected vertical line rectangles S are connected to form a curved line. The curved line may be further extended toward the edge or toward the bound boundary 41. The curved line is further adjusted by a line approximation or a polynomial curve approximation, as described in the operation of extracting horizontal character line.

Still referring to FIG. 22, if the Y coordinate of the vertical line rectangle refers to the bottom edge central point of the top circumscribed rectangle, the bottom edge central points of the selected vertical line rectangles are connected to form a curved line.

Further, in this step, an inappropriately extracted character line may be eliminated, in a substantially similar manner as described in the '743 patent application.

If the character line is extracted from the characters arranged vertically in the above-described manner, information regarding the character line, such as its relative location in the scanned image, is temporarily stored in the RAM 33. If the character line is not extracted, information indicating that no character line has been extracted is temporarily stored in the RAM 33.

Steps S41, S42, and S43 of FIG. 11 may be performed in any order, or at least one of Steps S41, S42 and S43 may be performed. For example, if the original includes a binary image, Step S41 may not be performed.

Figure 28:
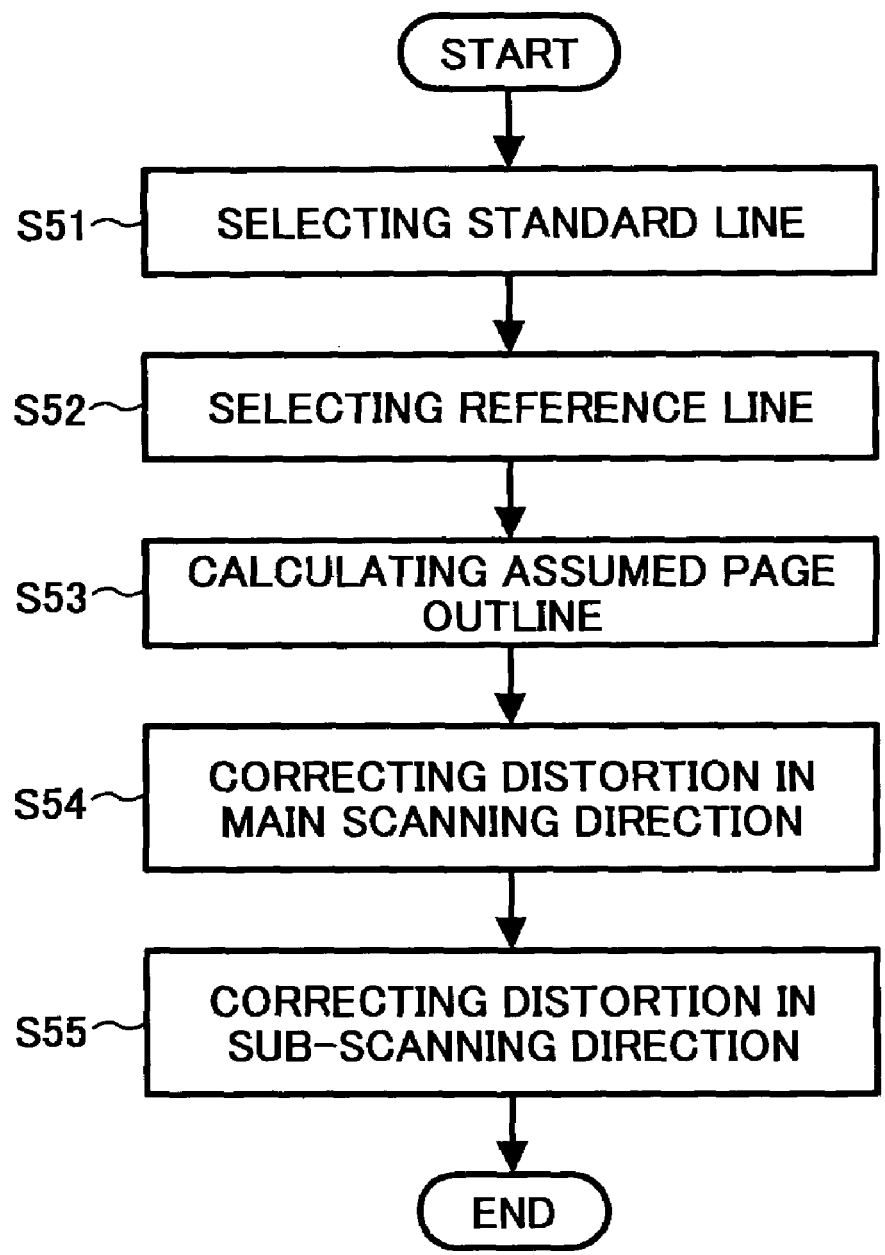
FIG. 28 is a flowchart illustrating further steps involved in the correcting step of FIG. 9.

Referring back to FIG. 9, Step S5 of correcting distortion is explained. As shown in FIG. 28, Step S5 includes steps S51 to S55 according to an exemplary embodiment of the present invention.

Step S51 selects a standard line for distortion correction, from the page outline, the rule line, or the character line, extracted in Step S4. Step S52 selects a reference line corresponding to the selected standard line. Step S53 determines an assumed page outline, if the standard line is either a rule line or a character line. Step S54 corrects distortion in the main scanning direction. Step S55 corrects distortion in the subscanning direction. These steps are performed in a substantially similar manner described in the '743 patent application, when a parameter of the scanner 1 is known. The parameter includes any one of a focal distance of the lens 10 and a position of the optical axis, for example.

Figure 29:
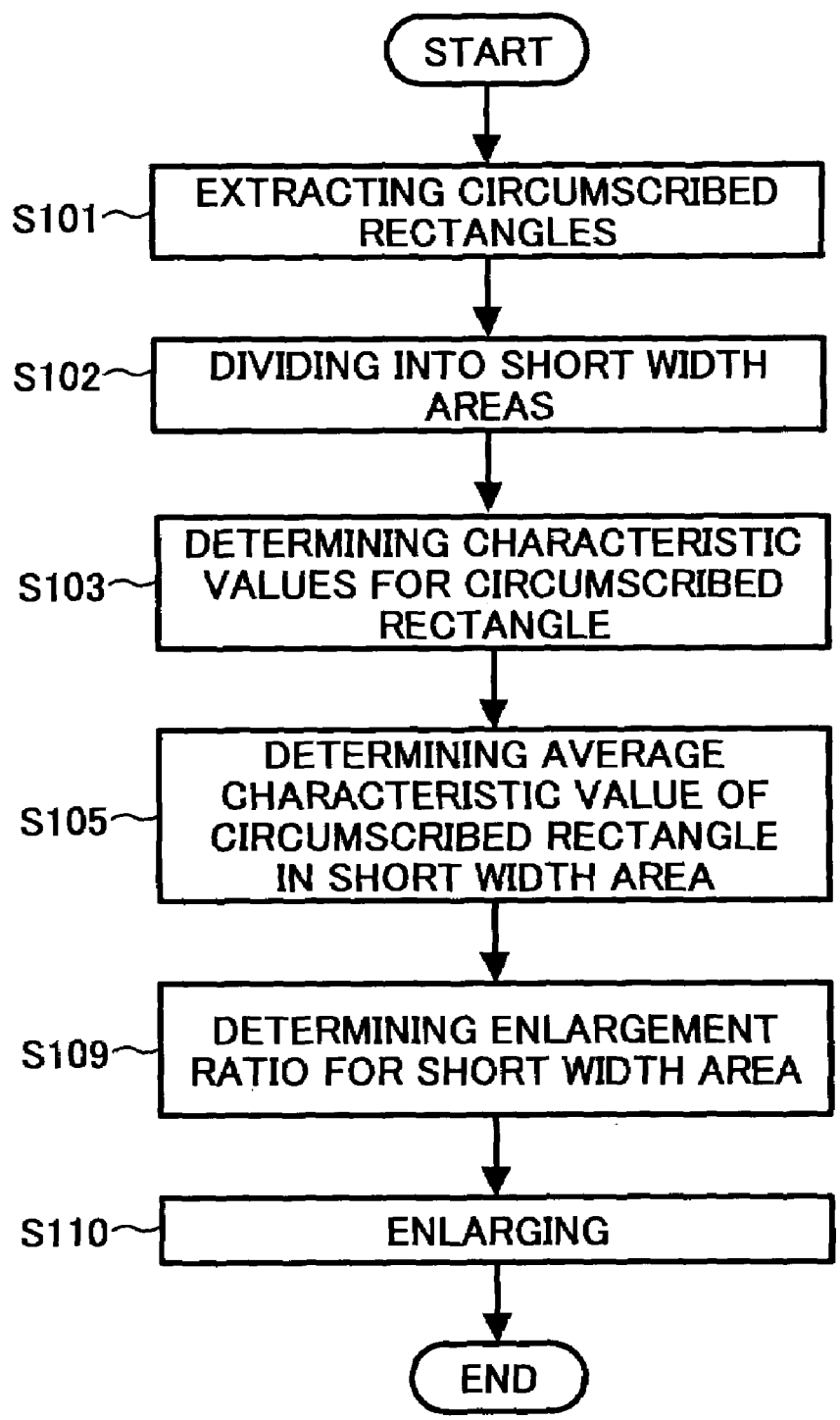
FIG. 29 is a flowchart illustrating further steps involved in the sub-scanning direction distortion correction of FIG. 28, according to an embodiment of the present invention.
Figure 32:
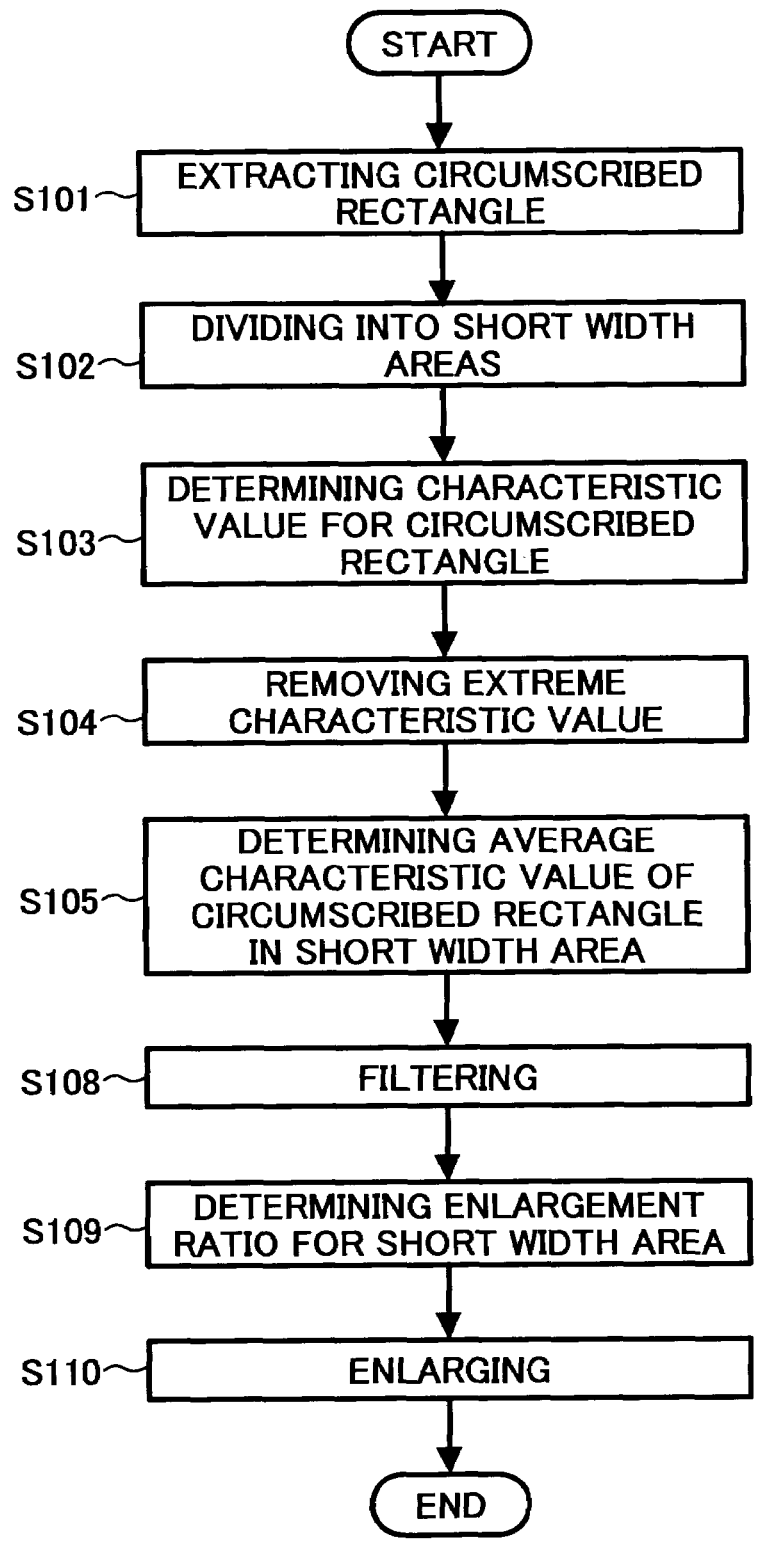
FIG. 32 is a flowchart illustrating further steps involved in the sub-scanning direction distortion correction of FIG. 28, according to another embodiment of the present invention.

Alternatively, Step S55 may be replaced with the following exemplary operation, described referring to any one of FIGS. 29 and 32.

Referring to FIG. 29, an exemplary operation of correcting sub-scanning distortion, when a parameter of the scanner 1 is known, is explained.

Figure 30:
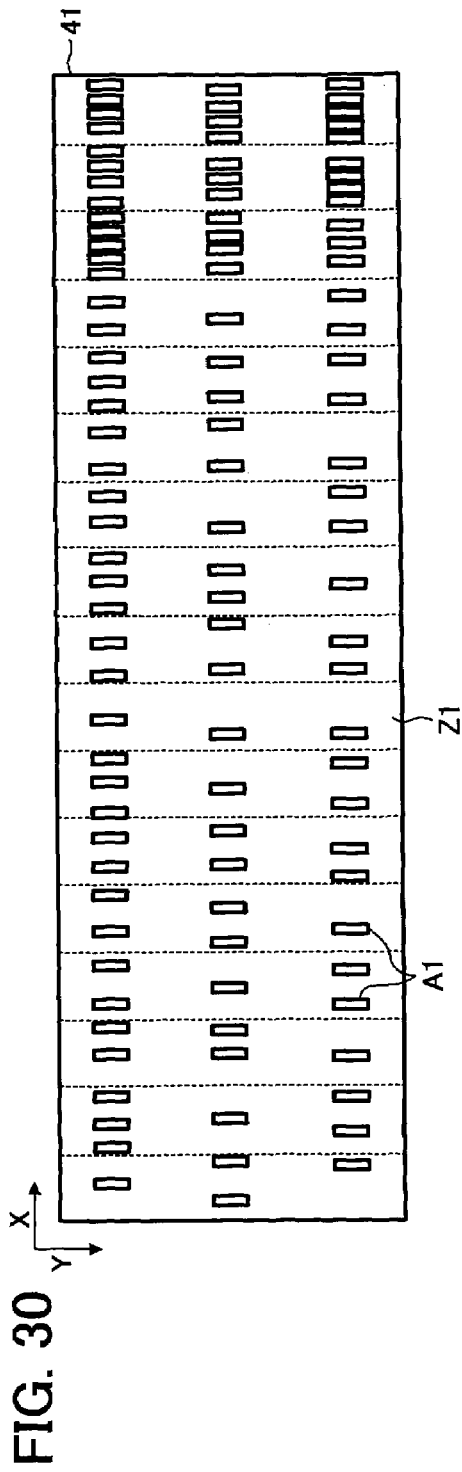
FIG. 30 is an illustration for explaining extracting circumscribed rectangles and dividing into short width areas, according to an embodiment of the present invention.

Step S101 extracts one or more circumscribed rectangles A1 from the scanned image that has been corrected in the main scanning direction Y, as illustrated in FIG. 30.

Step S102 divides the scanned image into a plurality of short width areas Z1, which has a longitudinal length arranged in parallel to the bound boundary 41 of the scanned image.

Step S103 determines characteristic values of the circumscribed rectangles A1 for each of the short width areas Z1. The characteristic value is determined based on the distance W (FIG. 31) between the two adjacent circumscribed rectangles A1.

Figure 31:
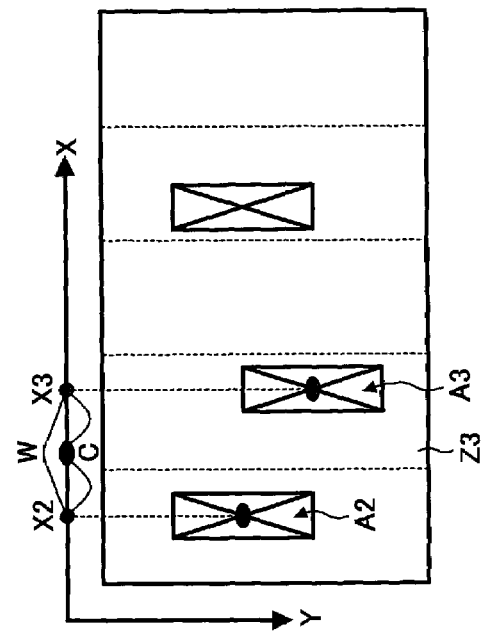
FIG. 31 is an illustration for explaining determining an average characteristic value, according to an embodiment of the present invention.

In the exemplary case shown in FIG. 31, a target circumscribed rectangle A2 having the X coordinate value X2, and a circumscribed rectangle A3 having the X coordinate value X3 are located adjacent to each other in the sub-scanning direction X. As shown in FIG. 31, the X coordinate value refers to the crossing point of diagonal lines of the circumscribed rectangle A1. The distance W between the X coordinate values X2 and X3 is determined by subtracting X3 from X2. The short width rectangle Z3 to which the central point C, having the distance W/2 from the point X2 or X3, is determined. In a similar manner, all target circumscribed rectangles having the central points belonging to the short width rectangle Z3 are detected. The distances W of the detected circumscribed rectangles are determined as the characteristic values for the short width rectangle Z3.

Step S105 determines the average of the characteristic values, i.e. the average of the distances W, for each of the short width rectangles Z1.

Step S109 determines an enlargement ratio for each of the short width areas Z1, based on the determined average characteristic value, i.e., the average distance.

For example, the average distance having a largest value in the scanned image is selected as a standard average distance W0. The enlargement ratio is determined by the following equation for each of the short width areas, having the average characteristic value W1:

(standard average distance)/(average distance)=$W0/W1$.

Step S110 enlarges each of the short width areas Z1 in the subscanning direction X, using the corresponding enlargement ratio obtained in Step S109. This enlargement process may be implemented by the three dimensional convolution method, for example.

FIG. 32 illustrates another exemplary operation of correcting subscanning distortion, when a parameter of the scanner is known.

Step S104 removes a characteristic value that may be out of a predetermined range. For example, in Step S103, the characteristic value, i.e., the distance W, having an undesirably small or large value may be obtained when the corresponding character has a smaller or larger width. In such a case, the distance W having a value within a predetermined range may be selected to determine the average distance.

Step S108 applies filtering to the average characteristic values in the scanned image. Step S108 may be performed before Step S104.

Further, as described in the '743 patent application, Step S109 may obtain the speculated distortion, which is the inversion of the enlargement ratio. Furthermore, Step S106 or Step S107 of FIG. 38 in the '743 patent application may be added to the flowchart of FIG. 32.

As disclosed in the Patent Application Publication No. 2003/0198398, the entire contents of which are hereby incorporated by reference, Step S55 of FIG. 28 may be performed differently, when the parameter of the scanner 1 is known.

Figure 33A:
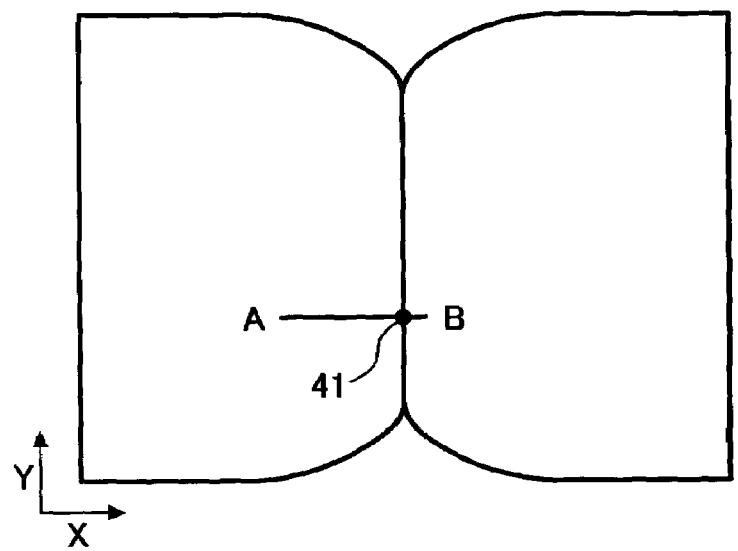
FIGS. 33A and 33B are illustrations for explaining enlarging when a parameter of the scanner 1 is known, according to an embodiment of the present invention.
Figure 33B:
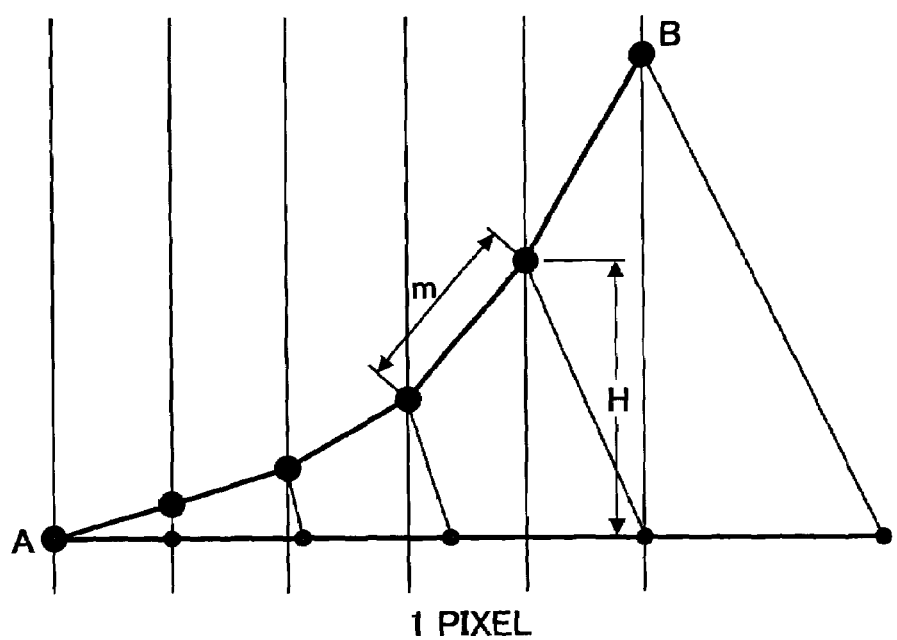

For example, based on the distortion amount from the point A to the point B of the scanned image shown in FIG. 33A, the amount by which the book document 40 rises above the exposure glass 2, that is, the height H of FIG. 33B, is determined. Based on the height H, a scaling factor m can be calculated at each pixel position within the distorted portion. Using the scaling factor m, distortion in the subscanning direction is corrected.

After completion of Step S5 of FIG. 9, the distortion in the scanned image of FIG. 10 is corrected as illustrated in FIG. 34.

Numerous additional modifications and variations are possible in light of the above teachings. It is therefore to be understood that within the scope of the appended claims, the disclosure of this patent specification may be practiced otherwise than as specifically described herein.

For example, the scanner 1 may have a structure different from the structure described referring to FIG. 4, as long as it is capable of correcting image distortion. Further, the placement of the book document 40 is not limited to the above-described exemplary case, shown in FIG. 5.

Further, the distortion correction function may be performed by a device other than the scanner 1. In one example, the scanner 1 may be connected to a personal computer. The scanner 1 sends image data read from an original to the personal computer. The personal computer loads the program of the present invention, and operates according to the present invention. In another example, the personal computer may perform distortion correction on image data, which has been stored in its storage device or received from the outside.

What is claimed as new and desired to be protected by Letters Patent of the United States is:

1. A method of correcting image distortion, comprising; using a processor to perform the steps of:
   obtaining a scanned image assumed to have distortion caused by scanning;
   extracting a pixel run for each character from the scanned image, the pixel run caused to have a selected ranged length in a main scanning direction forming a circumscribed rectangle for each character based on the extracted pixel run having the selected ranged length, the circumscribed rectangle representing a vertical component of the character;
   extracting a character line based on the circumscribed rectangles, the character line including the circumscribed rectangles for one or more of the characters that are arranged in a same line; and
   correcting the distortion by using the character line, wherein the forming further includes:
      adjusting the length of the circumscribed rectangle in the main scanning direction to be within a predetermined value,
   wherein the character line extracting includes:
      defining a coordinate of each of the circumscribed rectangles in the character line, with the coordinate being a central point of the circumscribed rectangle in the main scanning direction; and
      defining coordinates of the character line based on the coordinates of the circumscribed rectangles,
   wherein when the coordinate of the character line is located relatively closely to a coordinate of the character line that is adjacent with the character line, the length of at least one of the circumscribed rectangles in the character line is reduced without changing the coordinate of the at least one of the circumscribed rectangles.

2. The method of claim 1, further comprising:
   determining orientation of the characters in the scanned image.

3. The method of claim 1, further comprising:
   selecting an optimal character line for the correcting from the character lines based on a character line selection standard.

4. The method of claim 2, wherein the characters are determined to be horizontally oriented.

5. The method of claim 2, wherein the characters are determined to be vertically oriented.

6. The method of claim 5, further comprising:
   determining a distorted portion and an undistorted portion in the scanned image;
   grouping the circumscribed rectangles into a vertical line rectangle;
   selecting an optimal vertical line rectangle for the distortion correction from the vertical line rectangles, wherein the optimal vertical line rectangle is selected differently for the distorted portion and the undistorted portion;
   defining a coordinate of each of the optimal vertical line rectangles; and
   defining coordinates of the character line based on the coordinates of the vertical line rectangles.

7. The method of claim 6, wherein the coordinate of the optimal vertical line rectangle includes a coordinate of an upper edge central point of the circumscribed rectangle located at the top of the optimal vertical line rectangle.

8. The method of claim 6, wherein the coordinate of the optimal vertical line rectangle includes a coordinate of a bottom edge central point of the circumscribed rectangle located at the top of the optimal vertical line rectangle.

9. A method of correcting image distortion, comprising; using a processor to perform the steps of:
   obtaining a scanned image assumed to have distortion caused by scanning;
   extracting a pixel run for each character from the scanned image, the pixel run caused to have a selected ranged length in a main scanning direction forming a circumscribed rectangle for each character based on the extracted pixel run having the selected ranged length, the circumscribed rectangle representing a vertical component of the character;
   extracting a character line based on the circumscribed rectangles, the character line including the circumscribed rectangles for one or more of the characters that are arranged in a same line; and
   correcting the distortion by using the character line, wherein the correcting includes:
      dividing the scanned image into a plurality of short width areas, each area having a longitudinal length parallel to the main scanning direction and each area having one or more of the circumscribed rectangles;
      determining an average characteristic value for each of the short width areas from characteristic values of the one or more circumscribed rectangles, wherein the characteristic value of the circumscribed rectangle includes a distance between the circumscribed rectangles adjacent with each other in the sub-scanning direction;
obtaining a correction ratio for each of the short width areas based on the average characteristic value; and
correcting the distortion in the sub-scanning direction, using the correction ratio.

10. The method of claim 9, wherein the distance between the circumscribed rectangles adjacent with each other is obtained as a distance between a coordinate of a target circumscribed rectangle and a coordinate of the circumscribed rectangle arranged next to the target circumscribed rectangle in the sub-scanning direction.

11. The method of claim 10, wherein the coordinate includes a crossing point of diagonal lines of the circumscribed rectangle.

12. The method of claim 9, wherein the correction ratio determining includes:
selecting a standard average characteristic value from the average characteristic values in the scanned image data, with the correction ratio being determined based on the ratio between the standard average characteristic value and the average characteristic value of each short width area.

13. The method of claim 12, wherein the standard average characteristic value includes the largest average characteristic value in the scanned image.

14. The method of claim 9, further comprising:
selecting the characteristic value based on a predetermined standard, with the selected characteristic values being used for the average characteristic value determining.

15. The method of claim 9, further comprising:
applying filtering to the average characteristic value.

16. A method of correcting image distortion, comprising:
using a processor to perform the steps of:
obtaining a scanned image assumed to have distortion caused by scanning;
extracting at least one of a page outline, a rule line, and a character line from the scanned image; and
correcting the distortion in the scanned image by using any one of the page outline, rule line and character line,
wherein the extracting the character line includes:
extracting a pixel run for each character from the scanned image, the pixel run caused to have a selected ranged length in a main scanning direction;
forming a circumscribed rectangle for each character based on the extracted pixel run having the selected range length, the circumscribed rectangle representing a vertical component of the character; and
extracting a character line based on the circumscribed rectangles, the character line including the circumscribed rectangles of one or more of the characters that are arranged in the same line,
wherein the forming further includes:
adjusting a length of the circumscribed rectangle in the main scanning direction to be within a predetermined value,
wherein the character line extracting includes:
defining a coordinate of each of the circumscribed rectangles in the character line, with the coordinate being a central point of the circumscribed rectangle in the main scanning direction; and
defining coordinates of the character line based on the coordinates of the circumscribed rectangles,
wherein when the coordinate of the character line is located relatively closely to a coordinate of the character line that is adjacent with the character line, the length of at least one of the circumscribed rectangles in the character line is reduced without changing the coordinate of the at least one of the circumscribed rectangles.

17. The method of claim 16, further comprising:
printing the corrected scanned image.

18. An image distortion correction apparatus, comprising:
a scanner configured to scan an original into a scanned image having one or more characters;
an image data processor connected to the scanner and configured to form a circumscribed rectangle for the one or more characters; and
an image distortion corrector connected to the image data processor and configured to correct sub-scanning direction distortion in the scanned image, using a correction ratio determined based on the distance between the circumscribed rectangles that are adjacent with each other.

19. An image distortion correction apparatus, comprising:
a scanner configured to scan an original into a scanned image having one or more characters;
an image data processor connected to the scanner and configured to extract a pixel run for each character of the one or more characters with the pixel run having a selected ranged length in a main scanning direction, to form a circumscribed rectangle for each character based on the extracted pixel run having the selected ranged length with the circumscribed rectangle representing a vertical component of the character, and to extract a character line based on the circumscribed rectangle with the character line including the circumscribed rectangles for one or more of the characters that are arranged in a same line; and
an image distortion corrector connected to the image data processor and configured to correct distortion in the scanned image by using the character line, wherein the image distortion corrector is further configured to:
determine a distorted portion and an undistorted portion in the scanned image;
group the circumscribed rectangles into a vertical line rectangle; and
select an optimal vertical line rectangle for the distortion correction from the vertical line rectangles, wherein the optimal vertical line rectangle is selected differently for the distorted portion and the undistorted portion.

20. A system for correcting image distortion, comprising:
a storage device;
a processor coupled to the storage device and configured to perform an image correcting operation, comprising:
obtaining from the storage device a scanned image assumed to have distortion caused by scanning;
extracting a pixel run for each character from the scanned image, the pixel run having a selected ranged length in a main scanning direction;
forming a circumscribed rectangle for each character based on the extracted pixel run having the selected ranged length, the circumscribed rectangle a vertical component of the character;
extracting a character line based on the circumscribed rectangles, the character line including the circumscribed rectangles for one or more of the characters that are arranged in a same line;
correcting the distortion by using the character line; and
adjusting the length of the circumscribed rectangle in the main scanning direction to be within a predetermined value,
wherein the correcting further comprises:
dividing the scanned image into a plurality of short width areas, each area having a longitudinal length parallel to the main scanning direction and each area having one or more of the circumscribed rectangles;

determining an average characteristic value for each of the short width areas from characteristic values of one or more circumscribed rectangles, wherein the characteristic value of the circumscribed rectangle includes a distance between the circumscribed rectangles adjacent with each other in the sub-scanning direction;

obtaining a correction ratio for each of the short width areas based on the average characteristic value; and correcting the distortion in the sub-scanning direction, using the correction ratio.

21. The system of claim 20, wherein the distance between the circumscribed rectangles adjacent with each other is obtained as a distance between a coordinate of a target circumscribed rectangle and a coordinate of the circumscribed rectangle arranged next to the target circumscribed rectangle in the sub-scanning direction.

22. A computer readable medium storing a computer program code configured to cause a processor to execute an image correcting operation, the image correction operation comprising:

obtaining a scanned image assumed to have distortion caused by scanning;

extracting a pixel run for each character from the scanned image, the pixel run having a selected ranged length in a main scanning direction;

forming a circumscribed rectangle for each character based on the extracted pixel run having the selected ranged length, the circumscribed rectangle representing a vertical component of the character;

extracting a character line based on the circumscribed rectangles, the character line including the circumscribed rectangles for one or more of the characters that are arranged in a same line;

correcting the distortion by using the character line; and adjusting the length of the circumscribed rectangle in the main scanning direction to be within a predetermined value, wherein the correcting further comprises:

dividing the scanned image into a plurality of short width areas, each area having a longitudinal length parallel to the main scanning direction and each area having one or more of the circumscribed rectangles;

determining an average characteristic value for each of the short width areas from characteristic values of the one or more circumscribed rectangles, wherein the characteristic value of the circumscribed rectangle includes the distance between the circumscribed rectangles adjacent with each other in the sub-scanning direction;

obtaining a correction ratio for each of the short width areas based on the average characteristic value; and correcting the distortion in the sub-scanning direction, using the correction ratio.

23. The apparatus of claim 18, wherein the image distortion corrector is further configured to:

divide the scanned image into a plurality of short width areas, each area having a longitudinal length parallel to the main scanning direction and each area having one or more of the circumscribed rectangles; and determine an average characteristic value for each of the short width areas from characteristic values of the one or more circumscribed rectangles, wherein the characteristic value of the circumscribed rectangle includes the distance between the circumscribed rectangles adjacent with each other, the correction ratio for each of the short width areas being obtained from the average characteristic value.

24. A system for correcting image distortion, comprising:

a processor configured to perform an image correcting operation, comprising:

obtaining a scanned image assumed to have distortion caused by scanning;

extracting a pixel run for each character from the scanned image, the pixel run caused to have a selected range length in a main scanning direction;

forming a circumscribed rectangle for each character based on the extracted pixel run having the selected ranged length, the circumscribed rectangle representing a vertical component of the character;

extracting a character line based on the circumscribed rectangles, the character line including the circumscribed rectangles for one or more of the characters that are arranged in a same line; and correcting the distortion by using the character line, wherein the forming further includes:

adjusting the length of the circumscribed rectangle in the main scanning direction to be within a predetermined value, wherein the character line extracting includes:

defining a coordinate of each of the circumscribed rectangles in the character line, with the coordinate being a central point of the circumscribed rectangle in the main scanning direction; and defining coordinates of the character line based on the coordinates of the circumscribed rectangles, wherein, when the coordinate of the character line is located relatively closely to a coordinate of the character line that is adjacent with the character line, the length of at least one of the circumscribed rectangles in the character line is reduced without changing the coordinate of the at least one of the circumscribed rectangles.

* * * * *

UNITED STATES PATENT AND TRADEMARK OFFICE
CERTIFICATE OF CORRECTION

PATENT NO. : 7,602,995 B2
APPLICATION NO. : 11/054396
DATED : October 13, 2009
INVENTOR(S) : Araki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1275 days.

Signed and Sealed this

Fourteenth Day of December, 2010

David J. Kappos
*Director of the United States Patent and Trademark Office*